United States Patent [19]
Yu

[11] Patent Number: 5,688,355
[45] Date of Patent: Nov. 18, 1997

[54] PROCESS FOR FABRICATING FLEXIBLE BELTS USING LASER ABLATION

[75] Inventor: Robert C. U. Yu, Webster, N.Y.

[73] Assignee: Xerox Corporation, Stamford, Conn.

[21] Appl. No.: 717,620

[22] Filed: Sep. 20, 1996

Related U.S. Application Data

[63] Continuation of Ser. No. 316,962, Oct. 3, 1994, abandoned.

[51] Int. Cl.$^6$ .................................................. B32B 31/00
[52] U.S. Cl. .................. 156/272.8; 156/73.4; 156/257; 156/258; 156/273.3; 156/304.5
[58] Field of Search .................... 156/73.1, 73.4, 156/137, 217, 257, 258, 272.2, 272.8, 273.3, 304.5, 379.6; 428/57, 60

[56] References Cited

U.S. PATENT DOCUMENTS

| | | | |
|---|---|---|---|
| 3,493,448 | 2/1970 | Powell et al. | 156/73 |
| 4,410,575 | 10/1983 | Obayashi et al. | 428/57 |
| 4,430,146 | 2/1984 | Johnson | 156/502 |
| 4,435,457 | 3/1984 | Sevo et al. | 428/60 X |
| 4,521,457 | 6/1985 | Russell et al. | 427/286 |
| 4,532,166 | 7/1985 | Thomsen et al. | 428/57 |
| 4,648,931 | 3/1987 | Johnston | 156/251 |
| 4,758,486 | 7/1988 | Yamazaki et al. | 430/56 |
| 4,776,904 | 10/1988 | Charlton et al. | 156/73.1 |
| 4,838,964 | 6/1989 | Thomsen et al. | 156/73.1 |
| 4,878,985 | 11/1989 | Thomsen et al. | 156/459 |
| 4,883,742 | 11/1989 | Wallbillich et al. | 430/275 |
| 4,937,117 | 6/1990 | Yu | 428/57 |
| 4,943,508 | 7/1990 | Yu | 430/129 |
| 4,959,109 | 9/1990 | Swain et al. | 156/73.4 |
| 4,968,369 | 11/1990 | Darcy et al. | 156/217 |
| 5,021,109 | 6/1991 | Petropoulos et al. | 156/137 |
| 5,039,598 | 8/1991 | Abramsohn et al. | 43/347 |
| 5,151,149 | 9/1992 | Swtz | 156/272.8 X |
| 5,208,087 | 5/1993 | Stigberg | 156/137 X |
| 5,273,799 | 12/1993 | Yu et al. | 428/57 |
| 5,286,586 | 2/1994 | Foley et al. | 430/56 |
| 5,298,956 | 3/1994 | Mammino et al. | |

FOREIGN PATENT DOCUMENTS

| | | | |
|---|---|---|---|
| 6154050 | 11/1981 | Japan | 156/257 |
| 0074315 | 5/1983 | Japan | 156/73.1 |
| 2044429 | 2/1987 | Japan | 156/272.8 |
| 3194131 | 2/1993 | Japan | |

*Primary Examiner*—David A. Simmons
*Assistant Examiner*—Paul M. Rivard

[57] ABSTRACT

A seamed flexible belt and process for fabricating the belt is disclosed. A flexible sheet having a substantially rectangular shape, a first major exterior surface opposite and parallel to a second major exterior surface and a first edge surface of a first marginal end region opposite to and parallel with a second edge surface of a second marginal end region is treated by removing by ablation with a masked excimer laser beam a first segment of material from the first major exterior surface at the first marginal end region to form at least one recess comprising at least one fresh substantally flat surface intersecting at least one adjacent wall at a right angle, the flat surface being substantially parallel to and spaced from the second major exterior surface; removing by ablation with a masked excimer laser beam a second segment of material from the second major exterior surface at the second marginal end region to form at least one recess comprising at least one fresh substantially flat surface intersecting at least one adjacent wall at a right angle, the flat surface being substantially parallel to and spaced from the first major exterior surface; overlapping the first marginal end region over the second marginal end region whereby the fresh substantally flat surface at the first marginal end surface mates with the fresh substantially flat surface at the second marginal end surface; and fusing the overlapped end regions together to form a fused seam.

12 Claims, 9 Drawing Sheets

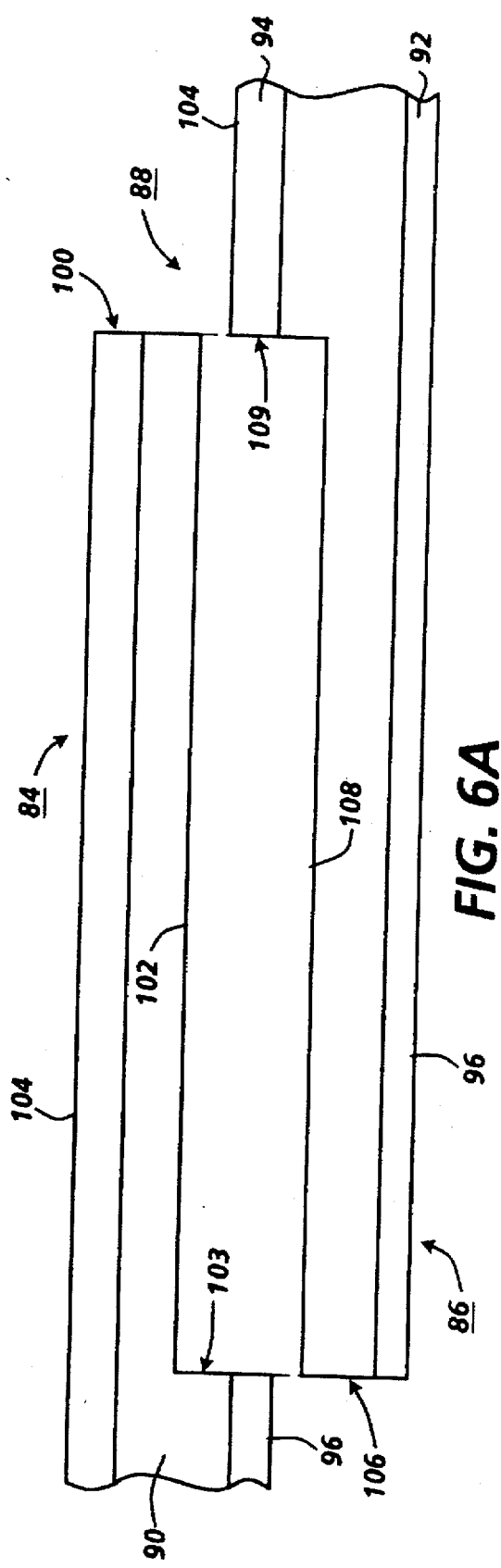
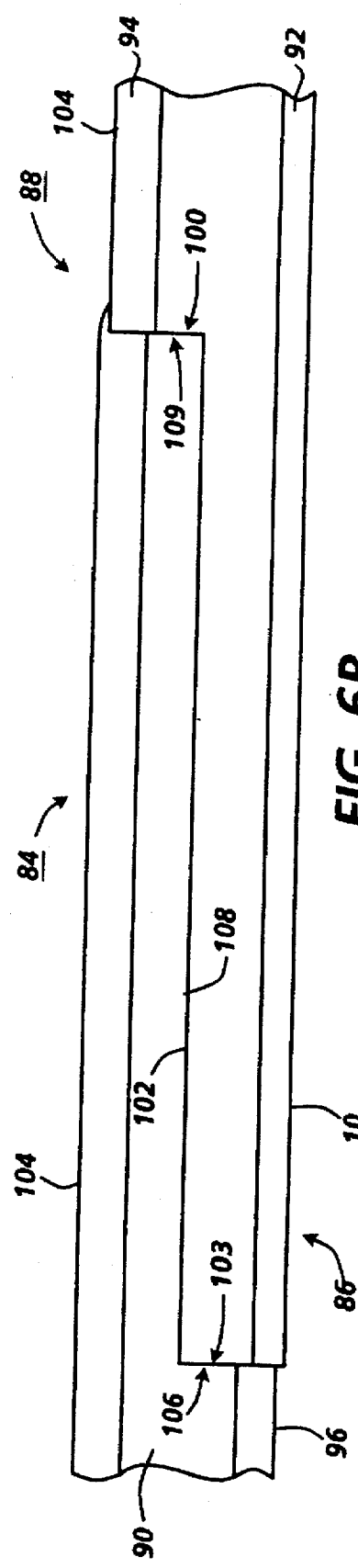

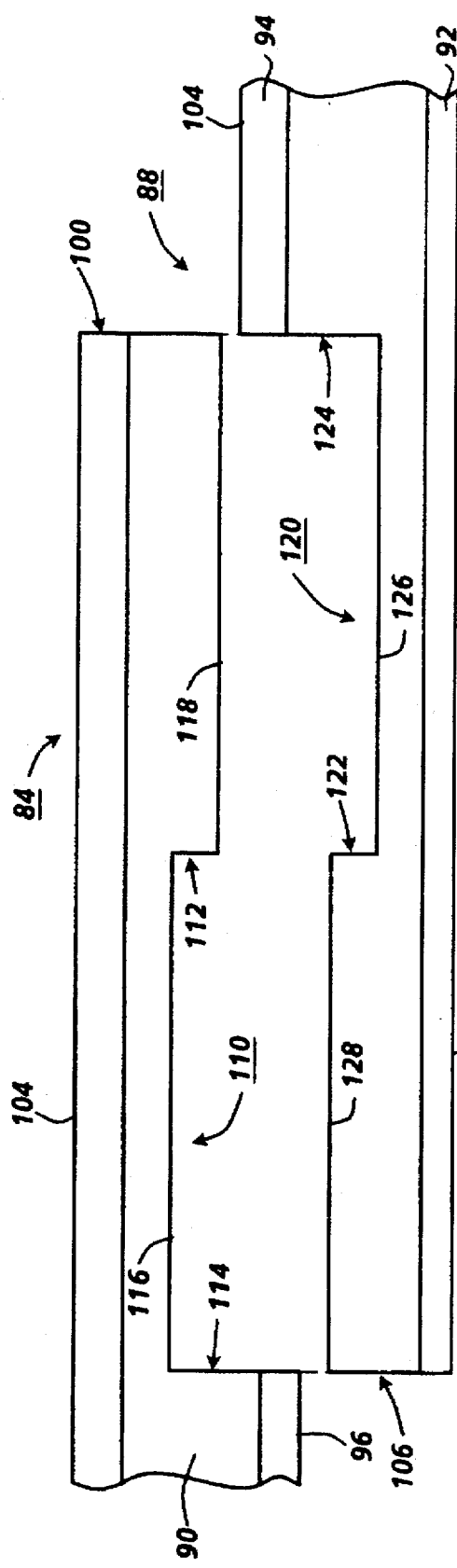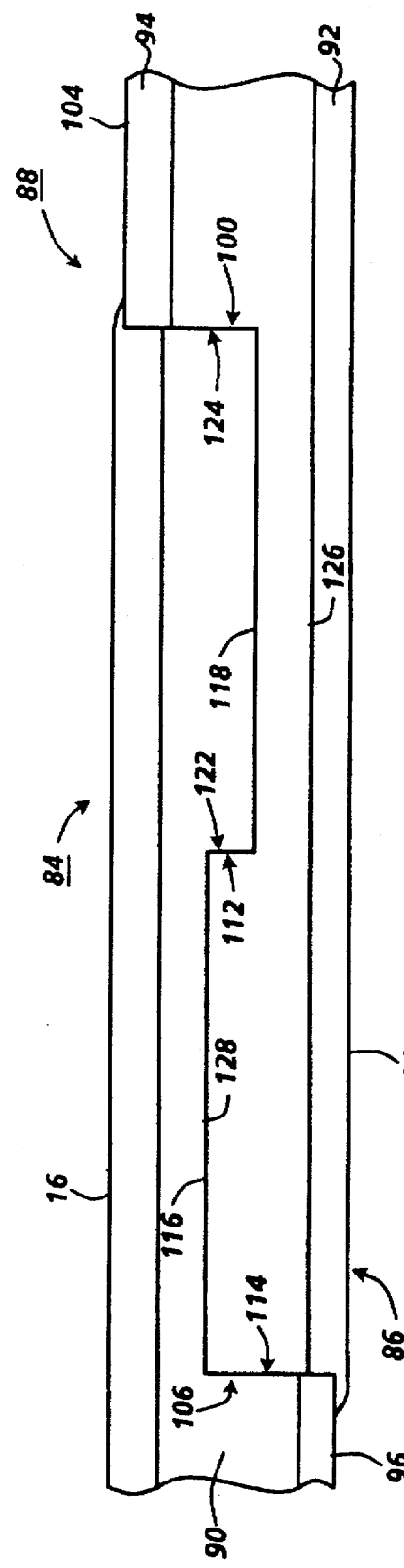
FIG. 7A
FIG. 7B

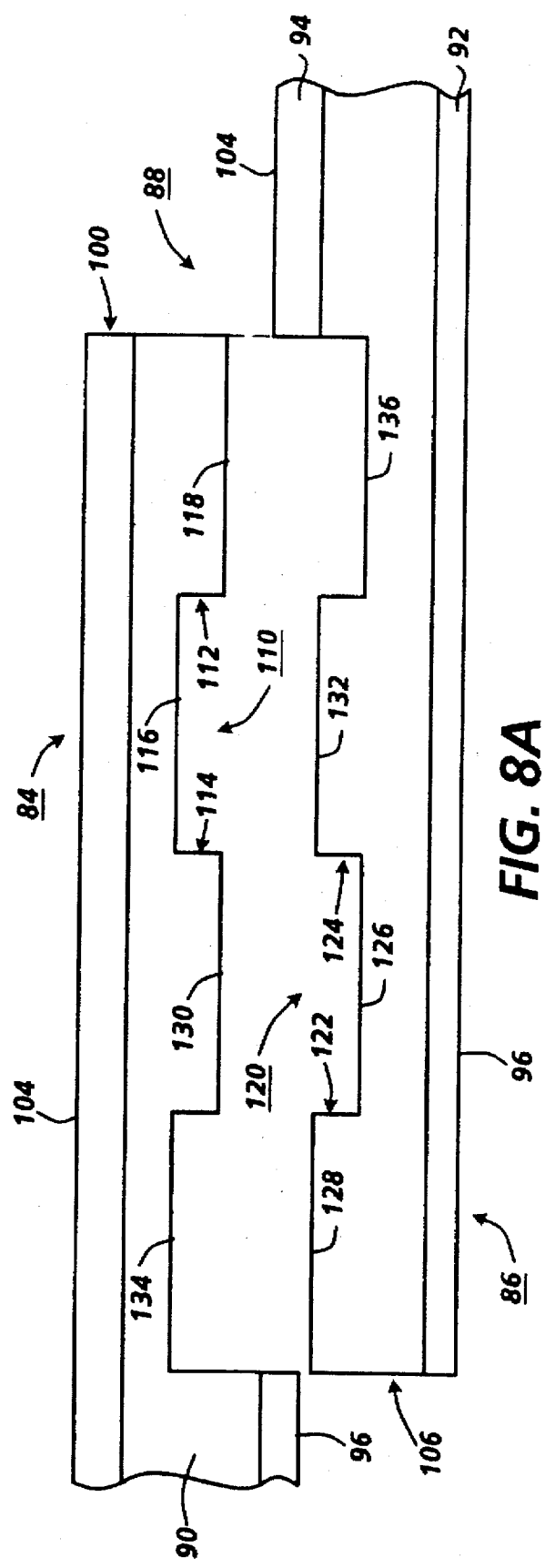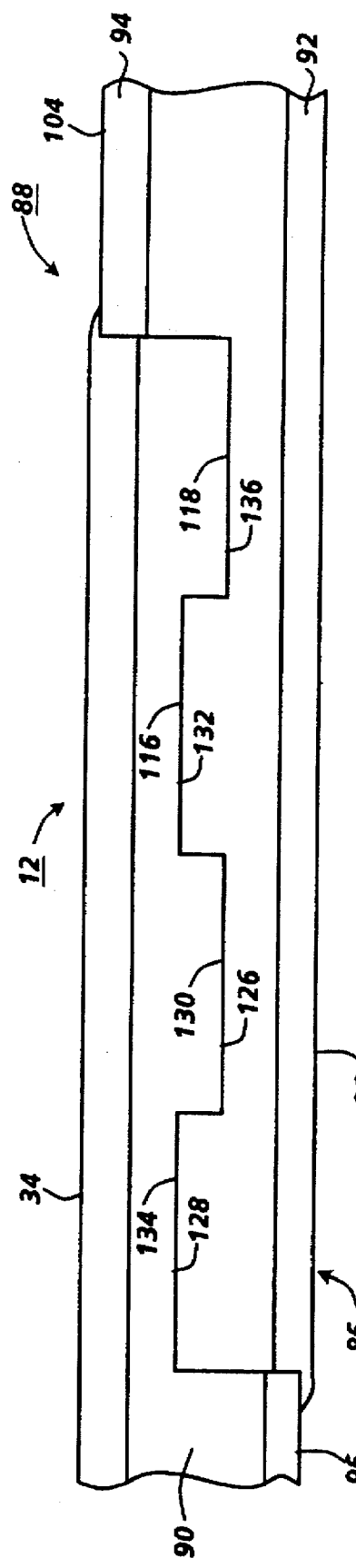
FIG. 8A
FIG. 8B

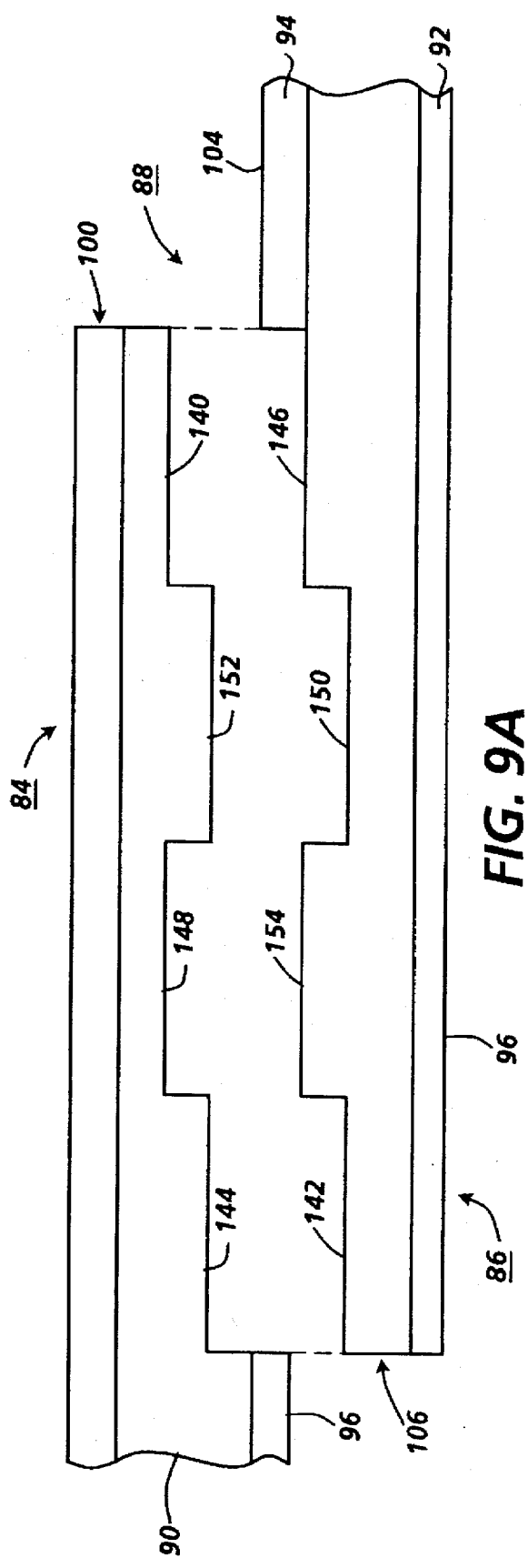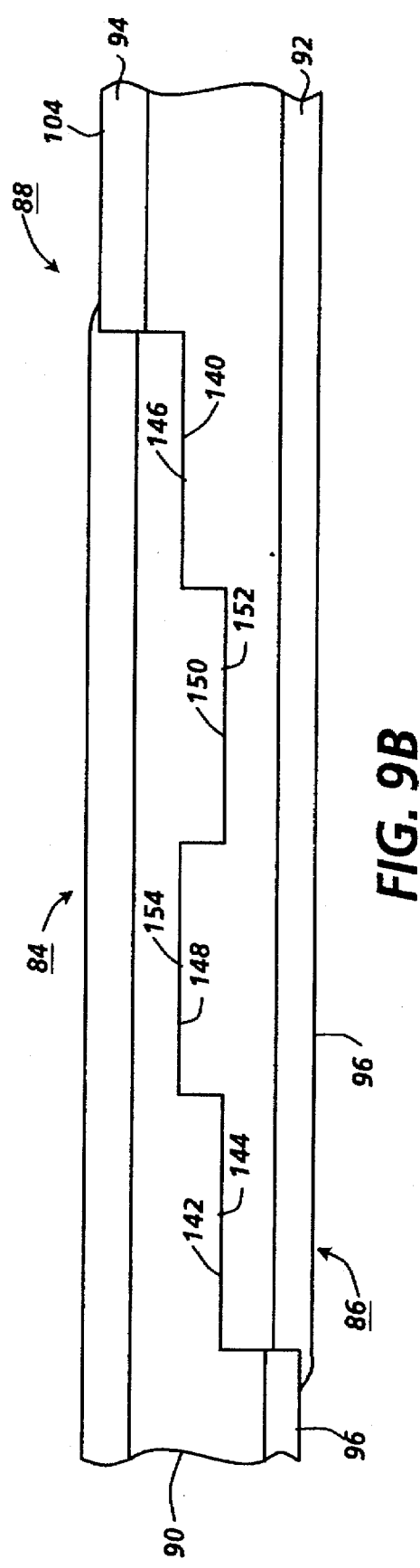

PROCESS FOR FABRICATING FLEXIBLE BELTS USING LASER ABLATION

This is a continuation of application Ser. No. 08/316,962, filed Oct. 3, 1994, now abandoned.

BACKGROUND OF THE INVENTION

This invention relates in general to flexible belts, and more specifically, to flexible belts fabricated with the aid of laser ablation treatment.

Coated flexible belts or tubes are commonly utilized for numerous purposes such as electrostatographic imaging members, conveyor belts, drive belts, intermediate image transfer belts, sheet transport belts, document handling belts, donor belts for transporting toner particles, and the like.

Flexible belts, such as electrostatographic imaging members, are well known in the art. Typical electrostatographic flexible imaging members include, for example, photoreceptors for electrophotographic imaging systems, and electroreceptors or ionographic imaging members for electrographic imaging systems. Both electrophotographic and electrographic imaging members are commonly utilized in a belt configuration. Electrostatographic imaging member belts commonly employed in the imaging machines have a welded seam. For electrophotographic applications, the imaging members preferably comprise a flexible substrate coated with one or more layers of photoconductive material. The substrates are usually organic materials such as a film forming polymer. The photoconductive coatings applied to these substrates may comprise inorganic materials such as selenium or selenium alloys, organic materials, or combinations of organic and inorganic materials. The organic photoconductive layers may comprise, for example, a single binder layer having dissolved or dispersed therein a photosensitivie material or multilayers comprising, for example, a charge generating layer and a charge transport layer. The charge generating layer is capable of photogenerating holes and injecting the photogenerated holes into the charge transport layer. The basic process for using electrostatographic flexible imaging members is well known in the art.

As more advanced, higher speed electrophotographic copiers, duplicators and printers were developed, degradation of image quality was encountered during extended cycling. Moreover, complex, highly sophisticated duplicating and printing systems operating at very high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. One typical type of multilayered imaging member that has been employed as a belt in electrophotographic imaging systems comprises a substrate, a conductive layer, a hole blocking layer, an adhesive layer, a charge generating layer, a charge transport layer, and a conductive ground strip layer adjacent to one edge of the imaging layers. This imaging member may also comprise additional layers, such as an anti-curl back coating layer to flatten the imaging member and an optional overcoating layer to protect the exposed charge transport layer from wear.

The electrophotographic imaging flexible member is usually fabricated from a sheet cut from a web. The sheets are generally rectangular in shape. All sides may be of the same length, or one pair of parallel sides may be longer than the other pair of parallel sides. The expression "rectangular", as employed herein, is intended to include four sided sheets where all sides are of equal length or sheets where the length of two equal parallel sides is unequal to the other two equal parallel sides. The sheets are fabricated into a belt by overlapping opposite marginal end regions of the sheet. A seam is typically produced in the overlapping marginal end regions at the site of joining. Joining may be effected by any suitable means. Typical joining techniques include welding (such as ultrasonic welding), gluing, taping, pressure heat fusing and the like. Ultrasonic welding is generally the preferred method for joining flexible polymeric sheets because of its speed, cleanliness (absence of solvents) and production of a strong and narrow seam. In the ultrasonic seam welding process, ultrasonic energy transmitted to the overlap region is used to melt the coating layers of the photoconductive sheet thereby providing direct substrate to substract contact of the opposite ends and fusing them into a seam. This ultrasonic welding joining process can, however, result in the formation of flashing and splashing that project, respectively, beyond the edges of the belt and onto either side of the overlap region of the seam. The seam flashing can be removed from either edge of the belt with the use of, for example, a reciprocating punch or notching device. The reciprocating punch has a small circular cross section and removes the flashing and part of the seam to form a generally semi-circular notch in either edge of the belt. Unfortunately, because of the overlap and presence of seam splashing, a typical flexible imaging member is about 1.6 times thicker in the seam region than elsewhere on the imaging member (e.g. about 188 micrometers versus 116 micrometers). Instead of overlapping the ends, one may also weld ends that are abutted end to end to reduce the seam thickness. With this alternative approach, the ends of the photoreceptor may be cut at a slight bias angle relative to the major surfaces of the belt to enhance abutting. But this butt joined embodiment has been found to exhibit weaker seam strength than a conventional overlapped seam. Moreover, the abutted ends embodiment, having ends cut at a slight angle relative to a major surface of the belt, also tend to slide over each other during the seam welding operation thereby causing the final welded photoreceptor belt to have a larger circumference than theroretical situations where the butt ends could somehow be maintained in precise alignment with each other during the entire ultrasonic seam welding process.

The photoreceptor belt is subjected to varying degrees of bending strain as it is cycled over a plurality of belt support rollers in an electrophotographic imaging apparatus. The excessive thickness of the photoreceptor belt in the seam region due to the presence of the splashing and seam overlap results in a larger induced bending strain at the seam than at the remainder of the photoreceptor belt as the seam passes over each support roller. It has been theoretically calculated that the bending stress is directly proportional to the thickness of the photoreceptor, but inversely related to the diameter of a belt support roller when the photoreceptor belt passes over each roller during cycling. This indicates that the combination of a thin photoreceptor seam design with larger belt support rollers is the most favorable choice for strain reduction and extended photoreceptor belt service life. Generally, small diameter support rollers are highly desirable for simple, reliable self-stripping copy paper systems in compact electrophotographic imaging apparatus requiring photoreceptor belt operation in a very confined space. Unfortunately, small diameter rollers, e.g., less than about 0.75 inch (19 millimeters) in diameter, raise the mechanical performance criteria threshold for photoreceptor belts to such a high level that premature photoreceptor belt seam failure frequently occurs thereby shortening the service life of the belt. For example, when bent over a 19 millimeter diameter roller, a conventional commercially available XEROX® welded photoreceptor belt seam may develop a 0.96 percent induced bending strain. Compared to a 0.59 percent tensile bending strain for the rest of the belt, the 0.96 percent tensile strain in the seam region of the belt represents a 63 percent increase in stress placed upon the overlapped seam and splashing which, in turn, leads to the development of seam cracking, delamination, and tearing during extended cycling.

Under dynamic fatiguing conditions, the seam overlap and splashing provide a focal point for stress concentration and become the initial point of failure that affects the mechanical integrity of the belt. Thus, the excessive thickness of the seam overlap and splashing tends to shorten the mechanical life of the seam and adversely affect service life of the flexible member belt in copiers, duplicators, and printers. Moreover, the excessive seam thickness and irregular splash protrusions cause the development of large lateral friction forces against cleaning blades during electrophotographic imaging and cleaning cycles. This mechanical interaction has been observed to severely affect the life of the imaging belt, exacerbates blade wear, and induces belt velocity variations during belt cycling.

In an electrophotographic imaging machine employing a liquid ink development system, the overlapped joint of an ultrasonically welded seam is too thick to provide proper imaging belt operation against various subsystem stations. For example it interacts and physically interferes with metering roll and development roll functions.

Although other innovative efforts to improve seam morphology such as seam surface smoothing by polishing; seam life extension by scribing the top surface of the seam to relieve bending stress/stress; and shape alteration of imaging sheet ends by mechanical grinding prior to overlapping and welding have all been successfully demonstrated, these techniques are cumbersome and very costly to implement.

INFORMATION DISCLOSURE STATEMENT

U.S. Pat. No. 5,273,799 issued to Yu et al. on Dec. 28, 1993—A flexible imaging sheet is disclosed. The flexible imaging sheet is fabricated by overlapping and forming steps. In the overlapping step, a first marginal end region and a second marginal end region of the sheet are overlapped. In the forming step, a substantially planar surface is formed, extending in a direction transverse to the sheet with one end of the planar surface being integral with the sheet adjacent one end of the sheet and the other end of the planar surface being integral with the sheet adjacent the other end of the sheet, for securing the first marginal end region and the second marginal end region to one another by a seam. The seamed flexible imaging member comprises a sheet having a first marginal end region and a second marginal end region. The first marginal end region and the second marginal end region of the sheet are secured to one another by a material which may include a portion of the sheet, a separate securing material or both. The material defines a planar surface extending in a direction transverse to the sheet with one end of the planar surface being integral with the sheet adjacent one end of the sheet and the other end of the planar surface being integral with the sheet adjacent the other end of the sheet. The planar surface minimizes stress on the sheet, particularly stress caused by the flexible imaging member bending over small diameter rollers of a belt module within an electrophotographic imaging apparatus.

U.S. Pat. No. 5,286,586 issued to Foley et al. on Feb. 15, 1994—A seamed flexible imaging member and a method of constructing a flexible imaging sheet are disclosed. The method of constructing the flexible imaging sheet comprises the steps of overlapping and forming. In the step of overlapping, a first marginal end region and a second marginal end region of the sheet are overlapped. In the forming step, a surface is formed integral with one end of the sheet and having at least one groove therein. The surface secures the first marginal end region and the second marginal end region to one another by a seam. The seamed flexible imaging member comprises a sheet having opposed marginal end regions. The marginal end regions of the sheet are secured to one another by a material which may include a portion of the sheet, a separate securing material or both. The material defines a surface having at least one groove therein with one end of the surface being integral with one end of the sheet. The groove in the surface minimizes stress on the sheet, particularly stress caused by the flexible imaging member bending over at least one small diameter roller of a belt module within an electrophotographic imaging apparatus.

U.S. Pat. No. 4,776,904 issued to Charlton et al. on Oct. 11, 1988—Discloses a method of making a multilayer analytical test element comprises providing layers at least one of which is responsive to detect a ligand in a liquid sample, or to detect the ligand binding capacity of the sample, and at least one other layer that is fusible when subjected to sonic energy, arranging the layers one on top of the other together to form a composite blank of layers, subjecting the composite to ultrasonic or laser energy to cut the composite to the desired dimension of the test element and to simultaneously weld the layers at the edges thereof, said energy softening and fusing the fusible layer to thereby bond the layers together.

U.S. Pat. No. 4,758,486 issued to Yamazaki et al. on Jul. 19, 1988—The fabrication of an endless belt photoconductor is disclosed. The belt comprises an electroconductive support material, a photoconductive layer formed thereon, a joint portion by which the electrophotographic photoconductor is worked into the shape of an endless belt. The joint portion is covered with an electroconductive overcoating layer comprising a polymeric material having a glass transition temperature of −10° C. or lower and finely divided electroconductive particles, or the joint portion further comprises a joint reinforcement resin layer which is interposed between the electroconductive overcoating layer and the photoconductive layer in the joint portion.

U.S. Pat. No. 4,883,742 issued to Wallbillich et al. on Nov. 28, 1989—Joining of an end and/or lateral areas of thermoplastically processable photosensitive layers is disclosed. The end and/or lateral areas of photosensitive layers are overlapped to avoid bubbles and air cavities between the end and/or lateral areas. The overlapped area is then heated under pressure to firmly join the areas together. The joined photosensitive layer is then treated and smoothed to shape it to size.

U.S. Pat. No. 4,410,575 issued to Obayashi et al. on Oct. 18, 1983—A method is disclosed for lap welding fabrics together by superposing two end portions of one or two fabrics on each other with an interposing a synthetic polymeric bonding tape between the superposed two end portions. The method includes applying a high frequency wave treatment and/or heat treatment to the interposed portion of the bonding tape through at least one of the superposed end portions while pressing them, to melt the interposed portion of the bonding tape thereby lap welding the end portions of the fabric or fabrics to each other. At least one side edge portion of the tape extends outwardly over an edge of the end portion which is deformed from the forces absorbed when the heat treatment and frequency wave treatment are applied. The fabrics may be made of any fiber.

U.S. Pat. No. 3,493,448 issued to Powell et al. on Feb. 3, 1970—A method of splicing photographic film with an ultrasonic welding apparatus is disclosed. The method comprises sand blasting the ends to be welded and chilling the fused ends to be fused together. The ends of the photographic film are overlapped and compressed together. Heat is introduced into the film ends to fuse them together.

U.S. Pat. No. 4,878,985 issued to Thomsen et al. on Nov. 7, 1989—A process and apparatus for fabricating belts are disclosed in which the leading edge of a web is conveyed from a supply roll into a belt loop forming station, the web is cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted trailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint.

U.S. Pat. No. 4,838,964 issued to Thomsen et al on Jun. 13, 1989—A process for fabricating belts are disclosed in which the leading edge of a web is conveyed from a supply roll into a belt loop forming station, the web is cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted trailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint.

U.S. Pat. No. 4,959,109 issued to Swain et al. on Sep. 25, 1990—Processes and apparatus for fabricating belts are disclosed comprising conveying a first mandrel to a wrapping station, supplying the leading edge of a web from a web supply roll to the first mandrel at the wrapping station, retaining the leading edge of the web on the first mandrel by means of a partial vacuum, wrapping the web around the first mandrel by rotating the first mandrel for about one revolution, severing the web at the wrapping station to form a trailing edge which overlaps the leading-edge of the web to form a first belt having a seam, substantially simultaneously conveying the first mandrel to a welding station and conveying a second mandrel to the wrapping station, and substantially simultaneously wrapping the second mandrel with fresh web material from the web supply roll and welding the seam on the first belt on the first mandrel to form a unitary belt. These welded belts may be automatically removed from the mandrels at a belt discharge station.

U.S. Pat. No. 4,532,166 issued to Thomsen et al. on Jul. 30, 1985—A welded web is disclosed comprising a first edge of a web having at least one aperture overlapping a second edge of a web comprising thermoplastic material on an exposed surface along the second edge to form a region of contiguous contact between the first edge and the second edge, at least a portion of the thermoplastic material at least partially filling the aperture thereby bonding the first edge to the second edge. The web may be formed by a process comprising providing a web having a first edge, providing a web having a second edge, forming at least one aperture in at least the first edge, overlapping the first edge over the thermoplastic material on the exposed surface along the second edge whereby the thermoplastic material on the second edge at least covers the aperture to form a region of contiguous contact between the first edge and the second edge, raising the temperature at least in the region of contiguous contact adjacent the aperture whereby thermoplastic material from the second edge at least partially fills the aperture thereby bonding the first edge to the second edge.

U.S. Pat. No. 4,648,931 issued to Johnston on Mar. 10, 1987—A method of forming a bead seal in a biaxially oriented polymer film by heat bonding is disclosed. The method comprises pressing together web layers in a sealing zone, a selected segment of the pressed web being heated above the bonding temperature of the plastic while adjacent web segments are maintained below that temperature. The heated web segment has a relatively lower surface friction than the surfaces pressing the adjacent web segment. The layers of the heated segment of the web are physically unrestrained against shrinking during heating and are allowed to shrink back to their pre-oriented molecular configuration while the adjacent segment is restrained against movement. A hermetic bead seal is thus formed between the web layers.

U.S. Pat. No. 4,430,146 issued to Johnson on Feb. 7, 1984—Apparatus for splicing thermoplastic coated belts is disclosed having a pair of longitudinal bars on which are respectively mounted platen heating assemblies, one bar being centrally supported pivotably on a clamping arrangement and the other bar being removably connectable with the clamping arrangement in a manner permitting pivotable positioning of the bar about one end thereof for pivotable disposition of the bars with their platens in opposed facing parallel relation at various spacings therebetween to permit uniform engagement by the bars of opposite sides of belt ends of varying thicknesses, and the clamping arrangement is adapted for bolted drawing of the bars together to grippingly retain the belt ends. The components of the apparatus are arranged for serial flow of direct electrical current through the heating assemblies and therebetween through the bars and the clamping arrangement for quick, low energy heating of the belt ends to fuse the thermoplastic material thereof. The apparatus facilitates a new belt splicing method eliminating the conventional need to use supplementary liquid thermoplastic material to effect bonding of the belt ends and thus a new belt splice is provided the spliced ends of which are bonded only by fusion of their respective thermoplastic material.

In U.S. application Ser. No. 07/982,530, filed on Nov. 25, 1992, now abandoned, a process is described which includes providing a flexible substantially rectangular sheet having a first major exterior surface opposite and parallel to a second major exterior surface, removing or displacing material from the first major exterior surface adjacent and perpendicular to a first edge of the sheet to form a new first surface having an elongated, curvilinear "S" shaped profile when viewed in a direction parallel to the first edge, overlapping the new first surface and a new second surface, created in the same manner as the new first surface, adjacent a second edge of the sheet whereby the first new surface contacts the new second surface to form a mated surface region, the new second surface being adjacent to or part of the second major exterior surface to form the sheet into a loop, the second edge being at an end of the sheet opposite from the first edge, and permanently joining the new first surface to the new second surface into a seam to form a seamed belt. The resulting welded belt has a seam thickness of less than about 120 percent of the total thickness of the belt. The shaped profiles may be fabricated by various techniques such as exposure to a laser, grinding and the like.

In another U.S. application Ser. No. 08/071,089, filed on Jun. 4, 1993, now U.S. Pat. No. 5,418,349, a process for treating a coated substrate to reduce the thickness of the coating is disclosed which involves directing a laser beam at a predetermined surface portion of the substrate to remove part of the coating. The process can be used to treat a coated photoreceptor to precisely reduce the thickness of the coating in a predetermined region.

Thus, there is a continuing need for extending the functional life of flexible belts, particularly electrostatographic imaging member belts, to achieve improved resistance to tearing, delamination, and cracking at the seam, as well as to suppress mechanical interactions between the seam and devices such as cleaning blades.

SUMMARY OF THE INVENTION

It is, therefore, an object of the present invention to provide an improved flexible belt which overcomes the above-noted disadvantages.

It is yet another object of the present invention to provide an improved flexible belt having a seam that exhibits greater resistance to tearing.

It is still another object of the present invention to provide an improved flexible belt with a seam exhibiting greater resistance to dynamic fatigue delamination.

It is another object of the present invention to provide an improved flexible belt having improved resistance to fatigue bending induced cracking.

It is yet another object of the present invention to provide an improved flexible electrostatographic imaging member belt which exhibits improved life during belt cycling.

It is still another object of the present invention to provide an improved process for fabricating seamed flexible belts.

It is another object of the present invention to provide a flexible belt having an improved seam morphology that reduces or eliminates belt velocity variations during belt cycling.

It is a further object of the present invention to provide an improved flexible electrophotographic imaging member belt having a reduced seam thickness with little or no splashings that minimizes cleaning blade and other contacting subsystems that interact with the seam of the belt.

It is still a further object of the present invention to provide an improved flexible electrophotographic imaging member belt having a thin seam profile that provides excellent belt cycling operation in liquid toner development systems.

The foregoing objects and others are accomplished in accordance with this invention by providing a flexible seamed belt and a process for fabricating the flexible belt. The fabrication process comprises providing flexible sheet having a substantially rectangular shape, a first major exterior surface opposite and parallel to a second major exterior surface and a first edge surface of a first marginal end region opposite to and parallel with a second edge surface of a second marginal end region; removing by ablation with a masked excimer laser beam a first segment of material from the first major exterior surface at the first marginal end region to form at least one recess comprising at least one fresh substantially flat surface intersecting at least one adjacent wall at a right angle, the flat surface being substantially parallel to and spaced from the second major exterior surface; removing by ablation with a masked excimer laser beam a second segment of material from the second major exterior surface at the second marginal end region to form at least one recess comprising at least one fresh substantially flat surface intersecting at least one adjacent wall at a right angle, the flat surface being substantially parallel to and spaced from the first major exterior surface; overlapping the first marginal end region over the second marginal end region whereby the fresh substantally flat surface at the first marginal end surface mates with the fresh substantially flat surface at the second marginal end surface; and fusing the overlapped end regions together to form a fused seam.

Electrostatographic flexible belt imaging member may be prepared by various techniques. A typical flexible supporting substrate is provided with an electrically conductive surface. For electrophotographic imaging members, at least one photoconductive layer is then applied to the electrically conductive surface. A hole or electron blocking layer may be applied to the electrically conductive surface prior to the application of the photoconductive layer. If desired, an adhesive layer may be utilized between the hole or electron blocking layer and the photoconductive layer. For multilayered photoreceptors, a charge generation layer is usually applied onto the hole or electron blocking layer and a charge transport layer is subsequently coated over the charge generation layer. For ionographic imaging members, an electrically-insulating dielectric layer is applied directly onto the electrically conductive surface.

The supporting substrate may be opaque or substantially transparent and may comprise numerous materials having the required mechanical properties. Accordingly, the substrate may comprise a layer of an electrically non-conductive or conductive material such as an inorganic or an organic composition. As electrically non-conducting materials there may be employed various thermoplastic resins known for this purpose including polyesters, polycarbonates, polyamides, polyurethanes, and the like which are flexible in thin webs. The electrically insulating or conductive substrate should be flexible and in the form of an endless flexible belt. Preferably, the endless flexible belt shaped substrate comprises a commercially available biaxially oriented polyester.

The thickness of the supporting substrate layer depends on numerous factors, including beam strength, mechanical toughness, and economical considerations. Thus, the substrate layer used for a flexible belt application may be of substantial thickness, for example, about 150 micrometers, or of a minimum thickness of about 50 micrometers, provided that it produces no adverse effects on the belt. Preferably, the thickness of the substrate layer is between about 75 micrometers and about 100 micrometers for optimum flexibility, beam rigidity, and minimum stretch during cycling.

Where a separate flexible conductive layer is employed, it may vary in thickness over substantially wide ranges depending on the optical transparency and degree of flexibility desired for the electrostatographic member.

Accordingly, for a flexible electrophotographic imaging device, the thickness of the conductive layer may be between about 20 angstroms and about 750 angstroms, and more preferably between about 100 angstroms and about 200 angstroms for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, copper, gold, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contain a thin metal oxide layer that has formed on the outer surface of an oxidizable metal layer. A typical electrical conductivity for conductive layers for electrophotographic imaging members in slow speed copiers is about $10^{-2}$ to $10^{-3}$ per ohms/square.

After formation of an electrically conductive surface, a hole blocking or electron blocking layer, hereinafter referred to as a charge blocking layer, may be applied thereto for photoreceptors. Generally, electron blocking layers for positively charged photoreceptors allow holes from the imaging surface of the photoreceptor to migrate toward the conductive layer and hole blocking layers for negatively charged photoreceptors allow electrons from the imaging surface of the photoreceptor to migrate toward the conductive layer. Any suitable charge blocking layer capable of forming an electronic barrier to holes or electrons between the adjacent photoconductive layer and the underlying conductive layer may be utilized. The charge blocking layer may be applied by any suitable conventional technique such as spraying, dip coating, draw bar coating, gravure coating, silk screening, air knife coating, reverse roll coating, vacuum deposition, chemical treatment and the like. The charge blocking layer should be continuous and have a dry thickness of less than about 0.2 micrometer.

An adhesive layer is usually applied to the charge blocking layer. Any suitable adhesive layer well known in the art may be utilized. Typical adhesive layer materials include, for example, polyesters, polyurethanes, and the like. Satisfactory results may be achieved with the adhesive layer thickness between about 0.05 micrometer and about 0.3 micrometer. Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable charge generating (photogenerating) layer may be applied onto the adhesive layer. Charge generating layers are well know in the art and can comprise homogeneous layers or photoconductive particles dispersed in a film forming binder. Examples of charge generating layers are described, for example, in U.S. Pat. No. 3,357,989, U.S. Pat. No. 3,442,781, and U.S. Pat. No. 4,415,639, the disclosures thereof being incorporated herein in their entirety. Other suitable photogenerating materials known in the art may also be utilized, if desired.

Any suitable polymeric film forming binder material may be employed as the matrix in of the photogenerating layer. Typical polymeric film forming materials include those described, for example, in U.S. Pat. No. 3,121,006, the disclosure thereof being incorporated herein in its entirety. The photogenerating composition or pigment may be present in the film forming binder composition in various amounts. Generally, from about 5 percent by volume to about 90 percent by volume of the photogenerating pigment is dispersed in about 10 percent by volume to about 90 percent by volume of the resinous binder. Preferably from about 20 percent by volume to about 30 percent by volume of the photogenerating pigment is dispersed in about 70 percent by volume to about 80 percent by volume of the resinous binder composition.

The photogenerating layer generally ranges in thickness from about 0.1 micrometer to about 5 micrometers, and more preferably from about 0.3 micrometer to about 3 micrometers. The photogenerating layer thickness is related to binder content. Higher binder content compositions generally require thicker layers for photogeneration.

Any suitable and conventional technique may be utilized to mix and thereafter apply the photogenerating layer coating mixture to the previously dried adhesive layer. Drying of the deposited coating may be effected by any suitable conventional technique.

The charge transport layer may comprise any suitable transparent organic polymer or non-polymeric material capable of supporting the injection of photogenerated holes or electrons from the charge generating layer and allowing the transport of these holes or electrons through the organic layer to selectively discharge the surface charge. The charge transport layer not only serves to transport holes or electrons, but also protects the photoconductive layer from abrasion or chemical attack. The charge transport layer should exhibit negligible, if any, discharge when exposed to a wavelength of light useful in xerography, e.g. 4000 Angstroms to 9000 Angstroms. The charge transport layer is normally transparent in a wavelength region in which the electrophotographic imaging member is to be used when exposure is effected therethrough to ensure that most of the incident radiation is utilized by the underlying charge generating layer. When used with a transparent substrate, imagewise exposure or erase may be accomplished through the substrate with all light passing through the substrate. In this case, the charge transport material need not transmit light in the wavelength region of use if the charge generating layer is sandwiched between the substrate and the charge transport layer. The charge transport layer in conjunction with the charge generating layer is an insulator to the extent that an electrostatic charge placed on the charge transport layer is not conducted in the absence of illumination. Charge transport layer materials are well known in the art.

The charge transport layer may comprise activating compounds or charge transport molecules dispersed in normally electrically inactive film forming polymeric materials. These charge transport molecules may be added to polymeric materials which are incapable of supporting the injection of photogenerated holes and incapable of allowing the transport of these holes. An especially preferred charge transport layer employed in multilayer photoconductors comprises from about 25 percent to about 75 percent by weight of at least one charge transporting aromatic amine, and about 75 percent to about 25 percent by weight of a polymeric film forming resin in which the aromatic amine is soluble. Examples of typical charge transporting aromatic amines include triphenylmethane, bis(4-diethylamine-2-methylphenyl)phenylmethane; 4'-4"-bis(diethylamino)-2', 2"-dimethyltriphenylmethane; N,N'-bis(alkylphenyl)-(1,1'-biphenyl)-4,4'-diamine wherein the alkyl is, for example, methyl, ethyl, propyl, n-butyl, etc.; N,N'-diphenyl-N,N'-bis (3"-methylphenyl)-(1,1'-biphenyl)-4,4'diamine; and the like, dispersed in an inactive resin binder.

Any suitable inactive thermoplastic resin binder may be employed. Typical inactive resin binders include polycarbonate resins, polyvinylcarbazole, polyester, polyarylate, polyacrylate, polyether, polysulfone, and the like. Molecular weights can vary from about 20,000 to about 150,000.

The thickness of the charge transport layer may range from about 10 micrometers to about 50 micrometers, and preferably from about 20 micrometers to about 35 micrometers. Optimum thicknesses may range from about 23 micrometers to about 31 micrometers.

An optional conventional ground strip may be utilized along one edge of the electrophotographic imaging member. The ground strip may comprise a film forming polymer binder and electrically conductive particles. The ground strip may comprise materials such as those enumerated in U.S. Pat. No. 4,664,995. The ground strip layer may have a thickness from about 7 micrometers to about 42 micrometers, and preferably from about 14 micrometers to about 23 micrometers.

An optional conventional anti-curl layer may also be employed The anti-curl layer may comprise thermoplastic organic polymers or inorganic polymers that are electrically insulating or slightly semi-conductive. The anti-curl layer provides flatness and/or abrasion resistance and may also contain microcrystalline silica or organic particulates to improve its frictional and wear properties. The anti-curl layer is formed at the back side of the substrate, opposite to the imaging layers. The thickness of the anti-curl layer is from about 3 micrometers to about 35 micrometers. An example of an anti-curl backing layer is described in U.S. Pat. No. 4,654,284, the entire disclosure of this patent being incorporated herein by reference.

An optional conventional overcoating layer may also be used. The optional overcoating layer may comprise organic polymers or inorganic polymers that are electrically insulating or slightly semi-conductive. The overcoating layer may range in thickness from about 2 micrometers to about 8 micrometers, and preferably from about 3 micrometers to about 6 micrometers.

For electrographic imaging members, a flexible dielectric layer overlying the conductive layer may be substituted for the photoconductive layers. Any suitable, conventional, flexible, electrically insulating dielectric thermoplastic polymer may be used in the dielectric layer of the electrographic imaging member. If desired, the concept of the morphologically improved seam configuration of this invention may be extended to flexible belts having different material compositions where cycling durability is important.

For intermediate image transport belts, the belt normally has an exposed outer surface layer containing an abhesive polymer that is flexible and stretchable. Typical abhesive polymers include tetrafluoroethylene, polysiloxane, fluorinated polyethylene, waxy polyethylene, waxy polypropylene, and the like such as disclosed in U.S. Pat. No. 4,196,256 and U.S. Pat. No. 5,049,444, the entire disclosures thereof being incorporated herein by reference.

Generally, electrostatographic imaging members are fabricated from webs by cutting the webs into rectangular sheets, overlapping a small segment of opposite ends of each sheet to form a loop and securing the overlapping ends of the sheet together to form a narrow seam. The overlapping ends of the sheet may be secured to each other by any suitable technique such as ultrasonic welding, gluing, taping, pressure heat fusing, and the like. The preparation of welded belts is well known and disclosed, for example, in U.S. Pat. No. 4,532,166 and U.S. Pat. No. 4,838,964. The disclosure of these patents are incorporated herein in their entirety. As discussed hereinabove, the joining techniques, particularly the welding process, usually forms a flashing and a splashing of molten thermoplastic material from the coating layers of the welded belt that project beyond the edges of the belt and are situated at the ends of the seam as well as at the either side of the overlap. The splashing present at both sides of the seam overlap of prior art electrostatographic imaging member belts can act as a focal point for concentrating stress to significantly reduce the service life of the seam due to cracking and delamination at the seam when the imaging member is subjected to bending tension and fatigue stress. Moreover, an excessive seam overlap thickness as well as the splashing can interfere with the functions of a cleaning blade, exacerbate blade wear and tear, affect quality of movement of the imaging belt, and disturb other subsystems such as image acoustic transfer assisting devices or metering/development rolls in machines employing liquid developer.

The thin seam profile of the belts of this invention not only minimizes the effects of repeated collisions with cleaning blades or acoustic image transfer assist devices, it is also compatible with liquid development subsystem functions. In addition, the low seam profile avoids snagging of donor wires on donor rolls in some types of development systems. Further, in comparisons of the seam of this invention with seams of a commercial welded belt, when flexed over a 3 mm diameter roller, the seam of the commercial welded belt delaminated after only 10 flexes whereas no delamination was observed for the belt seam of this invention after 1000 flexes.

Significant extension of the functional life of a seam, compatibility with liquid development/metering roll, as well as suppression of mechanical interactions between a belt and cleaning blades and other contacting subsystems are achieved with the belt of this invention. When joined by ultrasonic welding to give a welded overlapped seam, the thin profile seam of this invention exhibits only a slight increase in thickness compared to the thickness of the remainder of the belt and possesses no notable flashings at the two edges of the seam end and hardly any splashing at either side of the seam overlap.

BRIEF DESCRIPTION OF THE DRAWINGS

A more complete understanding of the seam configuration of flexible electrophotographic imaging belts of the present invention can be achieved by reference to the accompanying drawings wherein:

FIGS. 6A and 6B are cross sectional views of a seam of this invention that enhances alignment during welding.

FIGS. 7A and 7B are cross sectional views of another embodiment of an interlocking seam of this invention that maintains alignment during welding.

FIGS. 8A and 8B are cross sectional views of still another embodiment of an interlocking seam of this invention that maintains alignment during welding.

FIGS. 9A and 9B are cross sectional views of still another embodiment of an interlocking seam of this invention that maintains alignment during welding.

The figures are merely schematic illustrations. They are not intended to indicate the relative size and dimensions of actual seamed electrophotographic imaging members.

DETAILED DESCRIPTION OF THE DRAWINGS

For reasons of convenience, the following description will focus only on the fabrication of flexible multi-layered electrophotographic imaging member belts. However, the process of this invention is also applicable to other types of flexible belts such as intermediate image transfer belts, sheet transport belts, document handler belts, toner transporting donor belts, drive belts, conveyor belts, and the like.

Figure 1:
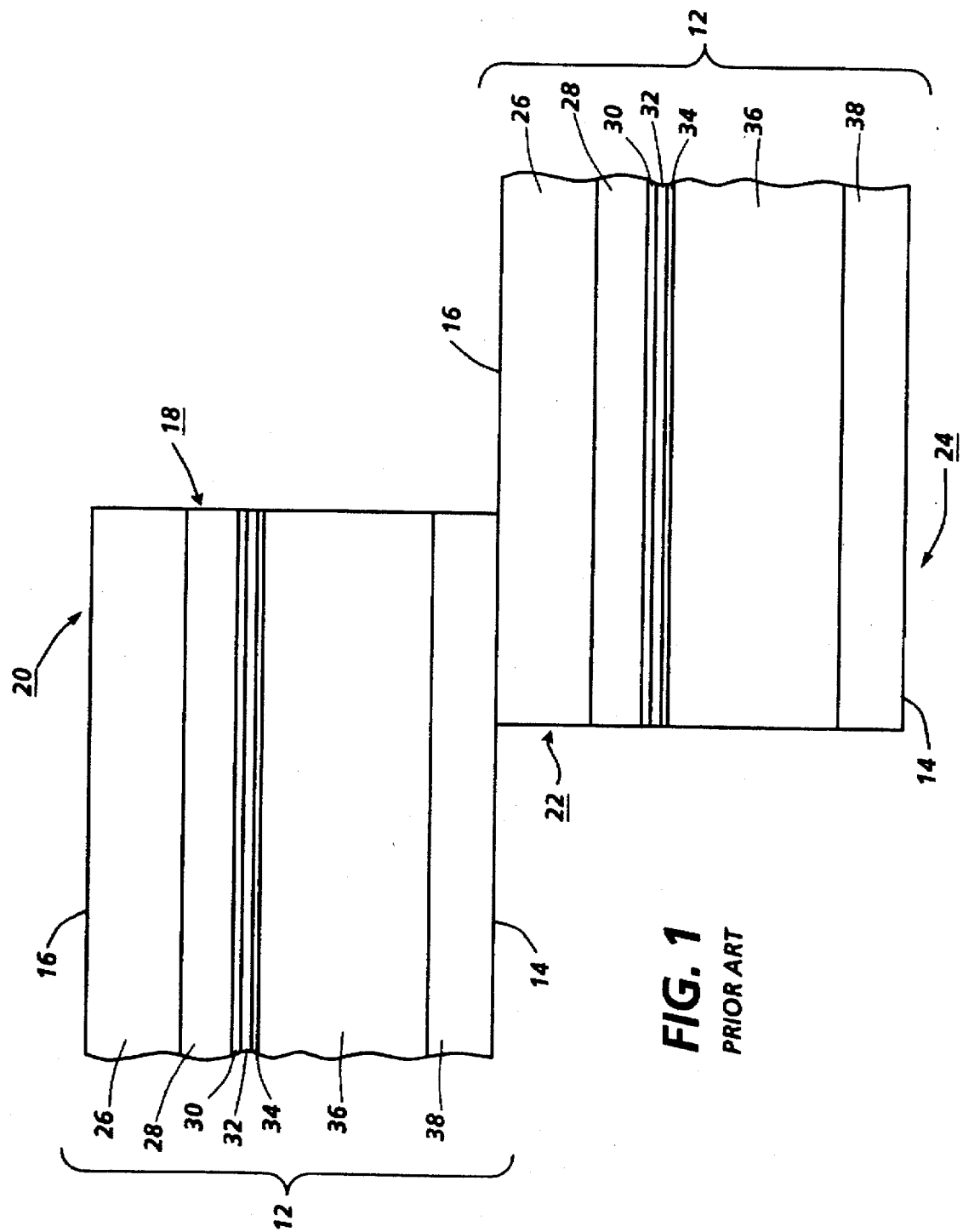
FIG. 1 is a cross sectional view of a flexible multiple layered electrophotographic imaging member of the prior art formed by overlapping opposite end regions of a sheet.

Referring to FIG. 1, there is illustrated a prior art flexible electrophotographic imaging member sheet 12 in the form of a substantially rectangular sheet having a first major exterior surface 14 opposite and parallel to a second major exterior surface 16. The expression "rectangular" as employed herein is intended to include shapes where opposite parallel edges are of equal length, adjacent edges are perpendicular to each other, and adjacent edges are of equal to or unequal lengths. Sheet 12 has a first edge surface 18 at a first marginal end region 20 opposite to and parallel with a second edge surface 22 at a second marginal end region 24. First marginal end region 20 overlaps second marginal end region 24 to form an overlapping region. Satisfactory overlap widths range from about 0.5 millimeter to about 3.5 millimeters. Flexible electrophotographic imaging member 12 may be utilized in an electrophotographic imaging apparatus and may be a single layer or multiple layer type photoreceptor. The layers of the flexible imaging member 12 may comprise any suitable materials having the requisite mechanical properties. These layers usually comprise charge transport layer 26, charge generating layer 28, adhesive layer 30, hole or electron charge blocking layer 32, conductive layer 34 supporting substrate 36 and anti-curl backing layer 38. Examples of various types of layers and the properties thereof are described, for example, in U.S. Pat. No. 4,786,570, U.S. Pat. No. 4,937,117 and U.S. Pat. No. 5,021,309, the disclosures thereof being incorporated herein by reference in their entirety. If desired, flexible imaging member 12 may comprise a charge transport layer sandwiched between a charge generator layer and a conductive surface.

Figure 2:
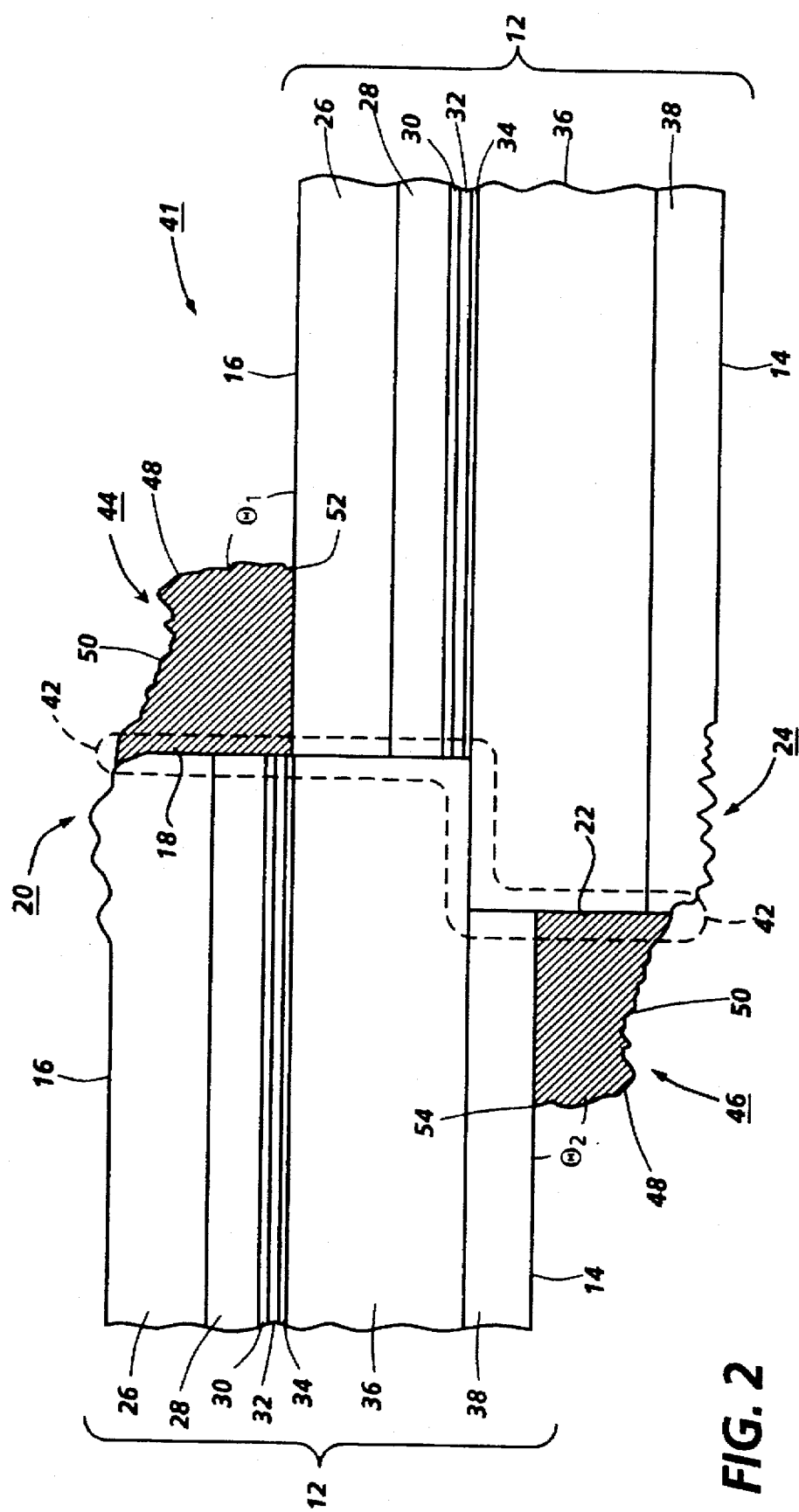
FIG. 2 is a cross sectional view of a flexible multiple layered seamed electrophotographic imaging belt of the prior art.

First marginal end region 20 and second marginal end region 24 may be joined by any suitable means including, for example, gluing, taping, stapling, pressure and heat fusing to form a continuous member such as a belt, sleeve, or cylinder. For reasons of convenience, the expression "belt" is intended to also encompass sleeves and cylinders. Generally, an ultrasonic welding technique is used to bond first marginal end region 20 and second marginal end region 24 into a welded seam 42 in the overlap region as illustrated in FIG. 2. Thus, electrophotographic imaging member sheet 12 illustrated in FIG. 1 is transformed into a prior art seamed electrophotographic imaging member belt 41 shown in FIG. 2. Imaging member belt 41 has first major exterior surface 14 on one side and second major exterior surface 16 on the opposite side. Seam 42 (represented by dashed lines) integrally joins second major exterior surface 16 at and/or near first edge surface 18 with the first major exterior surface 14 at and/or near second edge surface 22.

In the ultrasonic seam welding process, ultrasonic energy is applied to the overlap region to melt layers of flexible electrophotographic imaging member sheet 12 to form seam 42 illustrated in FIG. 2. Within the overlapping and abutting region of seam 42, portions of first marginal end region 20, second marginal end region 24, first edge surface 18, and second edge surface 22 overlap and abut one another. Welded seam 42 contains upper and lower splashings 44 and 46, respectively as illustrated in FIG. 2. Splashings 44 and 46 are formed during the process of joining portions of first marginal end region 20 and second marginal end region 24 together. Molten material is necessarily ejected from the overlap region to facilitate direct fusing of support substrate 26 of first marginal end region 20 to support substrate 26 of second marginal end region 24. This results in the formation of splashings 44 and 46. Upper splashing 44 is formed adjacent to first edge surface 18 and above second marginal end region 24. Lower splashing 46 is formed adjacent to second edge surface 22 and below first marginal end region 20 and abutting first major exterior surface 14 of first marginal region 20 and adjacent the overlapping second marginal end region 24 and abutting the second edge surface 22. Splashings 44 and 46 extend beyond the sides and the ends of seam 42 in the overlap region of welded flexible member belt 41 to form flashings (not shown). The extension of the splashings 44 and 46 beyond the sides and the ends of the seam 42 is undesirable for many machines, such as electrostatographic copiers and duplicators which require precise belt edge positioning of flexible imaging member belt 41 during machine operation. Generally, the extension of the splashings 44 and 46 to form flashings at both ends of seam 42 are usually removed by a notching operation which cuts a slight notch into each end of the seam to remove the end splashings and a tiny portion of the seam itself along with some imaging member material at the edges of the belt near the seam.

A typical splashing has a thickness of about 68 micrometers. Each of the splashings 44 and 46 have an uneven but generally rectangular cross sectional shape having first free sides 48 generally perpendicular to first and second major surfaces 14 and 16 and second free sides 50 generally parallel to first and second major exterior surfaces 14 and 16. Thus, first free side 48 of splashing 44 forms an approximately perpendicular angle $\theta_1$ with the second major exterior surface 16 of second marginal end region 24. Similarly, the first free side 48 of splashing 46 forms an approximately perpendicular angle $\theta_2$ with the first major exterior surface 14 of first marginal end region 20. A junction site 52 is formed at the junction of side 48 of splashing 44 and second major exterior surface 16. Likewise, a junction site 54 is also formed at the junction of the first free side 48 of the lower splashing 46 and the first exterior major surface 14. Both junction sites 52 and 54 provide focal points for stress concentration and become the initial sites of failure affecting the mechanical integrity of flexible imaging member belt 41.

During imaging machine operation, the seamed flexible imaging member belt 41 cycles or bends over belt support rollers (not shown), the degree of bend being particularly dramatic for small diameter rollers. As a result of repeated dynamic bending of flexible imaging member belt during cycling, small diameter rollers exert a bending strain on flexible imaging member belt 41 which causes great stress to develop generally around the overlapped seam region due to the excessive thickness thereof.

The stress concentrations that are induced by bending near junction sites 52 and 54 may reach values much larger than the average value of the stress exerted over the entire belt length of flexible imaging member belt 41. The induced bending stress is inversely related to the diameter of the roller over which imaging member bends and is directly related to the thickness of seam 42. Thus, when imaging member belt 41, has an enlarged cross-sectional thickness at the overlap region, high localized stress occurs near discontinuities, e.g. junction cites 52 and 54.

When seamed flexible imaging member belt 41 is bent over belt support rollers in an electrophotographic imaging apparatus (not shown), first major exterior surface 14 of the flexible imaging member, in contact the exterior surface of the roller, is under compression. In contrast, second major exterior surface 16 is stretched under tension. This is attributable to the fact that first major exterior surface 14 and second major exterior major surface 16 move through an arcuate path about a roller having a circular cross section. Since second major exterior surface 16 is located at a greater radial distance from the center of the roller than first exterior major surface 14, second major exterior surface 16 must travel a greater distance than first major exterior surface 14 in the same time period. Therefore, second major exterior surface 16 is stretched under tension relative to the generally central portion of the flexible imaging member belt 41 (the portion generally extending along the center of gravity of flexible imaging member). Conversely, first major exterior surface 14 is compressed relative to the generally central portion of flexible imaging member belt 41. Consequently, the bending stress at junction site 52 will be tension stress, and the bending stress at junction site 54 will be compression stress.

Figure 3:
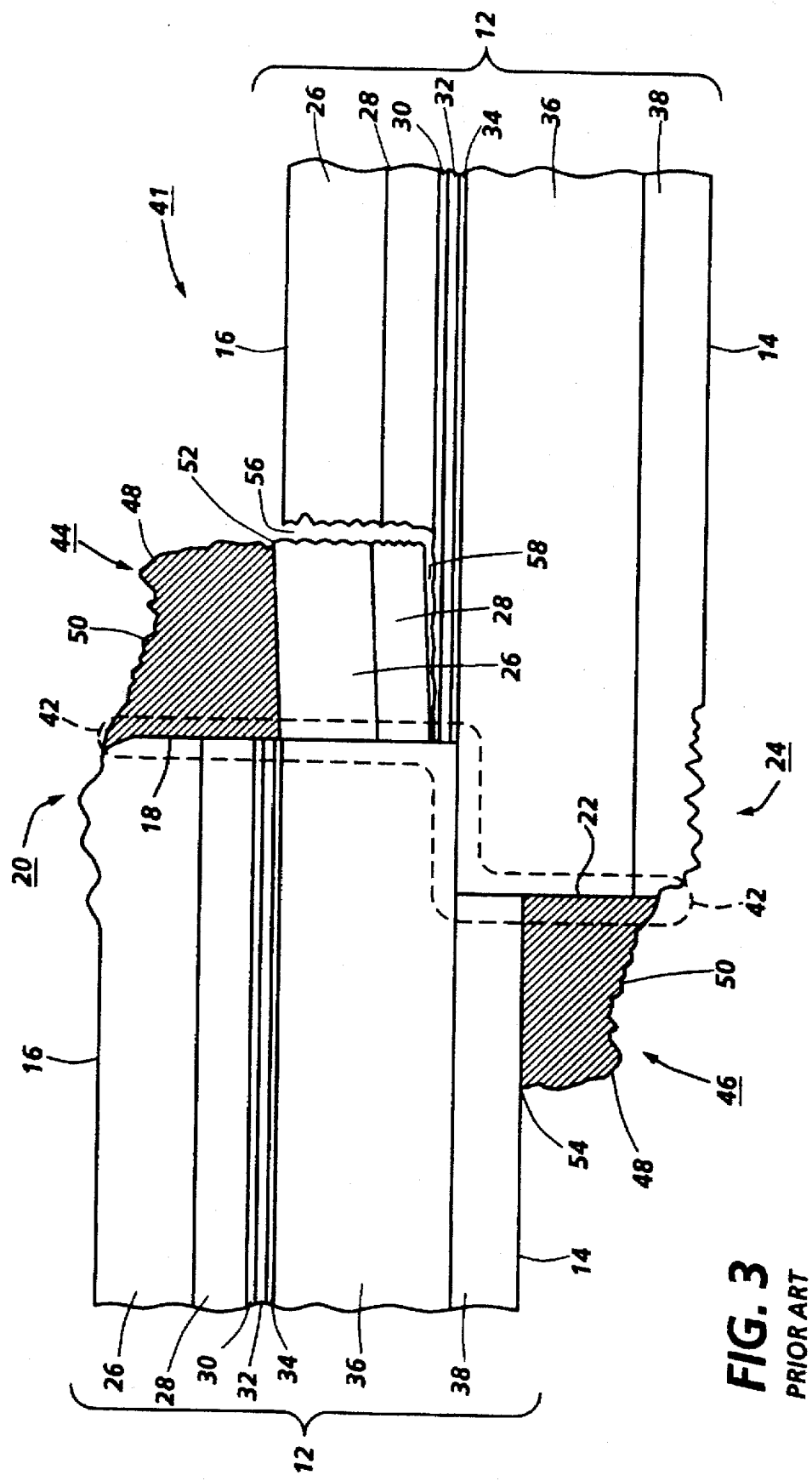
FIG. 3 is a cross sectional view of a flexible multiple layered seamed electrophotographic imaging belt of the prior art showing a seam that has cracked and delaminated after flexing over belt support rollers.

Compression stresses, such as at junction site 54, rarely cause failure of seam 40. Tension stresses, such as at junction site 52, however, are much more serious. The tension stress concentration at junction site 52 greatly increases the likelihood of tear initiation which will form a crack through the electrically active layers of flexible imaging member belt 41 as illustrated in FIG. 3. The generally vertically extending tear 56, illustrated in FIG. 3, is initiated in charge transport layer 26 and propagates through charge generating layer 28. Inevitably, tear 56 then extends horizontally leading to seam delamination 58 which propagates along the interface between the adjoining surfaces of the relatively weak adhesive bond between charge generating layer 28 and adhesive layer 30. Because of its appearance, localized seam delamination 58 is typically referred to as "seam puffing". The excessive thickness of splashing 44 and stress concentration at junction site 52 tend to promote the development of dynamic fatigue failure of seam 42 and can lead to separation of the joined marginal end regions edges 20 and 24 and severing the seam of imaging member belt 41. This greatly shortens the service life of flexible imaging member belt 41.

In addition, prior to causing seam separation, tear 56 functions as a depository site which collects toner particles, paper fibers, dirt, debris and other undesirable materials during electrophotographic imaging and cleaning. For example, during the cleaning process, a conventional cleaning instrument (not shown), such as a cleaning blade, will repeatedly pass over tear 56. As the site of tear 56 becomes filled with debris, the cleaning instrument dislodges at least a portion of highly concentrated debris from tear 56. The amount of the dislodged debris, however, is often beyond the capability of the cleaning instrument to adequately remove from imaging member belt 41. As a consequence, the cleaning instrument will dislodge the highly concentrated level of debris, but will not be able to remove the entire amount during the cleaning process. Therefore, portions of the highly concentrated debris will be re-deposited onto the surface of flexible imaging member belt 41. As a result, the cleaning instrument spreads the debris across the surface of flexible imaging member belt 41 rather than effectively removing the debris therefrom.

Besides leading to seam failure and debris spreading, when local seam delamination 58 occurs, the portion of flexible imaging member belt 41 above seam delamination 58, in effect, becomes a flap which can move upwardly. The upward movement of the flap presents an additional problem in the cleaning operation because it is an obstacle in the path of the cleaning instrument as the instrument travels across the surface of imaging member belt 41. The cleaning instrument eventually strikes the flap when the flap extends upwardly. As the cleaning instrument strikes the flap, great force is exerted on the cleaning instrument and can lead to blade damaging, e.g. excessive wear and tearing of the cleaning blade.

In addition to damaging the cleaning blade, collisions with the flap by the cleaning instrument causes unwanted velocity variations in imaging member belt 41 during cycling. This unwanted velocity variation adversely affects the copy/print quality produced by the imaging member belt 41, particularly in high speed precision machines such as color copiers where colored toner images must be sequentially deposited in precisely registered locations. More specifically, copy/print quality is affected because imaging takes place on one part of imaging member belt 41 simultaneously with the cleaning of another part of imaging member belt 41.

The velocity variation problems encountered with imaging member belt 41 are not exclusively limited only to the event while seam delamination 58 is occuring. The discontinuity in cross-sectional thickness of the imaging member 41 at junction sites 52 and 54 can also create unwanted velocity variations, particularly when imaging member belt 41 bends over rollers of a belt module. Moreover, splashing 46 underneath seam 42 can collide with acoustic image transfer assist subsystems (not shown) during dynamic belt cycling, thereby causing additional unacceptable imaging belt velocity disturbances. In a xerographic imaging machine using a liquid toner development system, the excessive seam/splashing thickness has also been observed to physically interact and interfere with development/metering roll performance.

To fabricate a thin profile seam structure that eliminates all the shortcomings associated with prior art seamed belts, the overlapping ends of a flexible imaging member are shape altered into a specific configuration by removing materials from each end with a masked excimer laser prior to overlapping these ends and welding them to form a seam. Although a photoreceptor sheet end may be mechanically ground with abrasives, such grinding is a slow and tedious process and precise shaping is difficult to control. It has also been found that a $CO_2$ laser utilizing a focused heat beam is unsuitable for the precise reshaping requirements of this invention. Although a $CO_2$ laser beam can be small and localized, it melts or burns the material upon which is focused. Because the wavelength of a $CO_2$ laser is about 10.6 micrometers, which is in the far infrared region of the spectrum, the $CO_2$ laser beam apparently functions much like a heat radiation beam that melts and burns away the material to be removed. This is evidenced by the appearance of smoke rising from the photoreceptor during $CO_2$ laser beam treatment. Moreover, the molten mass accumulation forms beads of surface protruberance upon cooling to room ambient. Localized heating caused by a $CO_2$ laser also tends to distort or warp photoreceptor substrates. This is illustrated in Example III. In addition, when heat-type laser beams are utilized, multiple passes are often required to control the removal of material from both marginal end regions of the imaging member. These multiple passes require complex equipment and prolong the time required for material removal. Attempts to use of a YAG laser having a wavelength of about 1.06 micrometers to remove material from a photoreceptor merely heats the photoreceptor and discolors the charge generator layer. This is illustrated in Example IV. Lasers that ablate photoreceptor layers by heating also causes undesirable ripples to form in the photoreceptor. These ripples trap toner particles which, in turn, tend to agglomerate and form smears on the photoreceptor surface or form particulate deposits in background areas of final imaged copies. In addition, the ripples trap air which is heated during ultrasonic welding to the point where expansion of the air causes bubbles that weaken the final welded photoreceptor seam. The presence of small bubbles (that heat up and expand during welding) can produce a pronounced weakness in the welded seam, particularly when the overlap of the sheet ends is relatively small.

To fabricate a thin profile seam design that eliminates all the shortcomings associated with the prior art seamed belts, the overlapping ends of a flexible imaging member sheet are precisely shape altered by removing materials from each end prior using a masked excimer laser ablation beam prior to overlapping and keying these ends together for welding into a seam. The welded seam belt of this invention preferably has a seam thickness of less than about 120 percent but greater than about 103 percent of the total thickness of the original sheet because seam overlap greater than about 120 percent thickness of the imaging member sheet will form a welded seam of inadequate seam thinning which fails to yield the desired benefit; however, an overlap region thinner than 103 percent will not absorb sufficient mechanical pounding energy from the ultrasonic horn action during seam welding process, and therefore, produces weak seam strength due to incomplete polymer fusing at the overlap. To achieve the present invention objective, a masked excimer ultraviolet laser ablation beam is employed to displace coating layers and reshape the two ends of a rectangular sheet to achieve a specific surface profile at the ends of the sheet prior to overlapping, keying and application of ultrasonic energy to welding it into a permanent lap-joined seam. Surprisingly, it has been found critical that masked excimer lasers are utilized to reshape the ends of a flexible imaging member prior to joining. Excimer lasers take their name from the excited state dimmers from which lasing occurs. Currently, the most important excimer lasers are the rate-gas-halides such as ArF, KrF, XeCl, and XeF which produce intense UV radiation of distinctive wavelengths from 193 nm (ArF), 248 nm (KrF), 308 nm (XeCl), to 351 nm (XeF). Since the excimer molecules have short life-times that exist for only a few nanoseconds, they require a fast excitation process. The excimer lasers, however, have no or only weakly bound ground states and they imply high gain and high energy capabilities. Thus, in comparison to solid state lasers, excimer lasers are easier to operate. In commercial excimer laser technology, the excitation process is executed by a fast high pressure electrical discharge applied to a gas mixture which contains small amounts of a halogen and a rate gas, diluted in helium or neon buffer gas. This results in generation of short UV laser pulses leaving the discharge cavity in a beam of fairly low divergence and having a characteristic rectangular profile having a cross section of a few $cm^2$. No heat is generated by an excimer laser and it does not burn the substrate. Therefore, an excimer laser does not heat or otherwise adversely affect areas adjacent the laser path. This permits greater control during removal of material. Excimer lasers convert the photoreceptor materials to a gas by breaking down the molecular chains of polymeric components of the photoreceptor into smaller fragments. The excimer laser beam is pulsed during operation. Satisfactory results may be achieved when the pulse frequency is between about 50 Hz and about 500 Hz. Preferred pulse frequency ranges from about 100 Hz to about 300 Hz. The frequency of the pulse selected for any given set of sheet materials depends upon the speed of traverse, distance and power of the laser beam. For example, a slower laser beam traverse permits a lower pulse frequency to achieve the desired removal of belt material to form the trough. Typical traverse rates for a flexible electrophotographic imaging member sheet are between about 30 mm per second and about 0.5 mm per second.

Figure 4A:
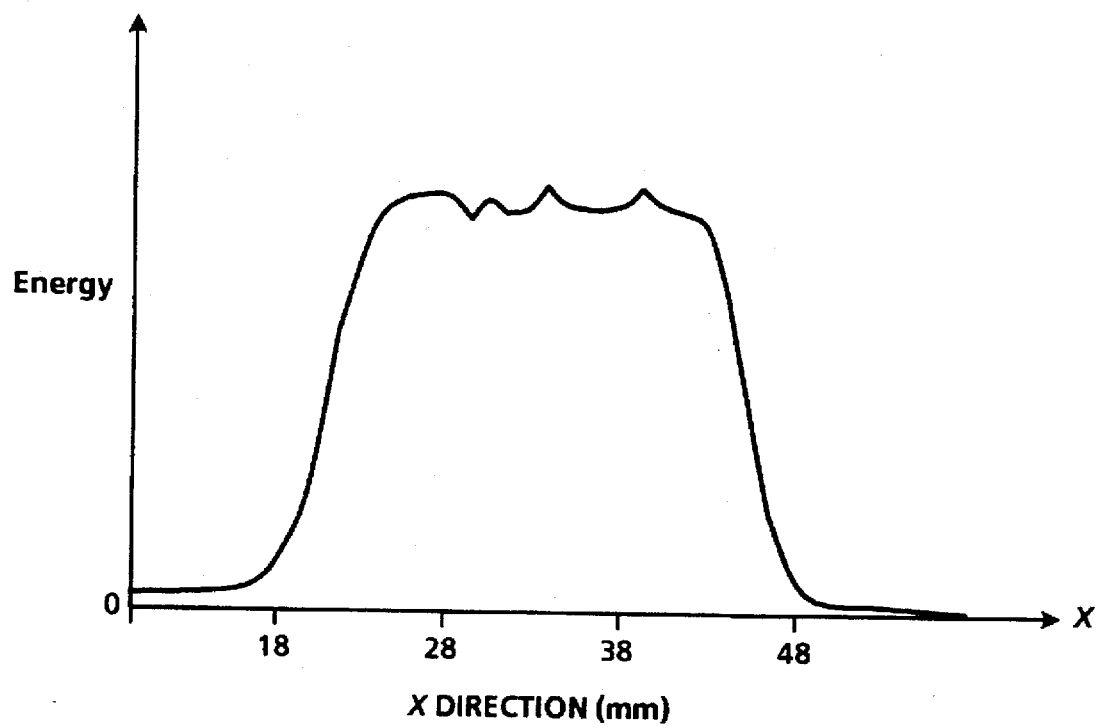
FIG. 4A is the X direction energy distribution of an ultraviolet excimer laser beam striking a flat surface which is situated perpendicular to the direction of the beam.
Figure 4B:
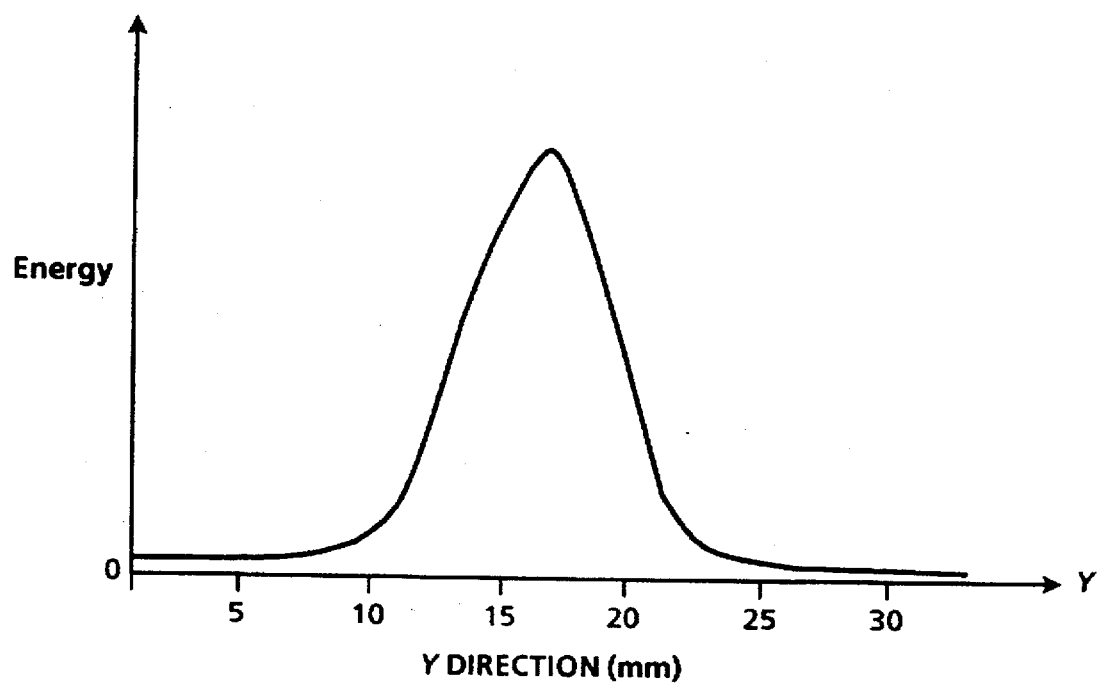
FIG. 4B is the Y direction energy distribution of the ultraviolet excimer laser beam striking the flat surface. The Y direction energy distribution is 90° to the direction of the X direction energy distribution of FIG. 4A.

The characteristic rectangular profile having a cross section of an excimer laser beam is illustrated in FIGS. 4A and 4B. In FIG. 4A, the spatial laser beam energy profile of an ultraviolet excimer laser is shown in the X direction; the beam profile in the X axis direction can be characterized as almost a "top hat" shape. FIG. 4B presents the spatial laser beam energy profile of the excimer laser in the Y axis direction which is perpendicular to the energy distribution direction of the X axis and exhibits a nearly "gaussian" profile. Thus, the beam profile in the X direction has the shape with steeply sloped sides and the profile in the direction is characterized as a spike with steeply sloped sides. Because of the shape of the steeply sloped sides of an excimer laser beam, uniform removal of material from the entire area struck by an excimer laser beam therefore can not be achieved, since precise control of the amount of material removed along the edges of an exposed area is much less than control of material removed from the center.

Figure 5:
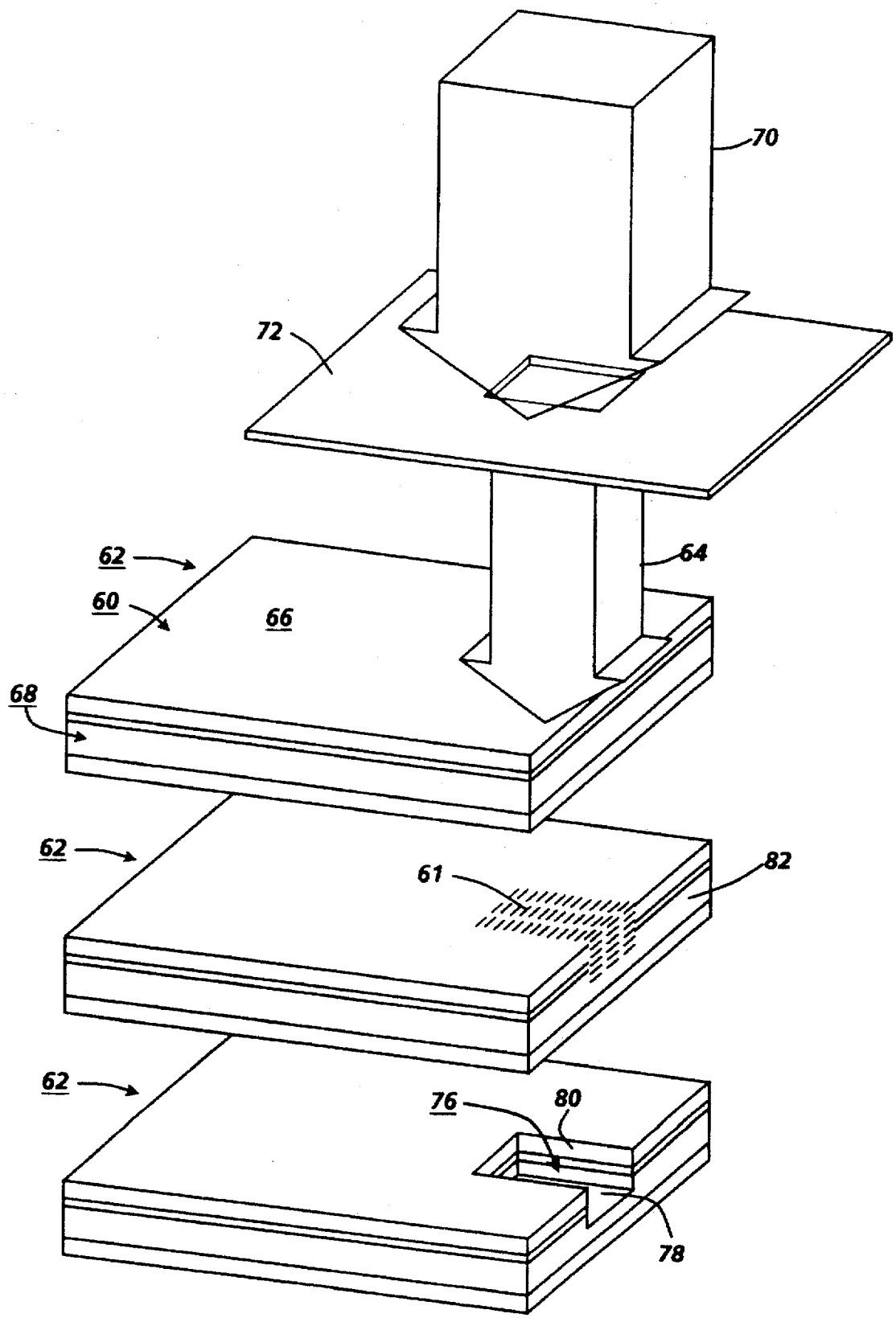
FIG. 5 depicts a masked excimer laser ablation process involving removal of coating material to a pre-determined depth to form a channel in an electrostatographic imaging member sheet.

The illustration in FIG. 5, represents a moment frozen in time of a first marginal end region 60 of a multi-layered, flexible electrophotographic imaging member 62 being traversed by a masked ultraviolet excimer laser beam 64, which is focused on second major exterior surface 66 along a first edge surface 68 of imaging member 62. Original excimer laser beam 70 is directed through a metal masking plate 72 having a rectangular opening 74 which removes the non uniform low energy edges (i.e. the sloping sides illustrated in FIGS. 4A and 4B) from beam 70 thereby providing an emerging masked ultraviolet excimer laser beam 64 of even energy distribution for precise coating layer material displacement when directed toward second major exterior surface 66. Unlike infrared lasers, such as $CO_2$ and YAG lasers which produce intense thermal heating effects, exposure of imaging member 62 to high energy short wavelength UV radiation from masked ultraviolet excimer laser beam 64 can produce a number of important effects including: energy absorption by long chain polymer molecules to elevate these molecules to an electronic excitation state in the coating layers; chain scission of the polymer molecules into small molecular fragments; ablation removal of the molecular fragments away from the surface as a puff of gas; and creation of a new surface adjacent first edge surface 68 of imaging member 62. In this manner, each masked exceimer laser pulse displaces a thin layer of material 61 from imaging member 62 to precisely remove imaging member material and shape first marginal end region 60 in full accordance with a predetermined surface profile. The laser beam 70 is pulsed during the imaging member shaping operation. The frequency of the laser pulses is adjustable from only about a few pulses per second to about 300 Hz. Since each laser pulse occurs on an extremely brief time scale and provides only the energy for molecular excitation of the polymer coating, no heat is generated in the process to cause dimensional distortion or material melting to the imaging member 62. The masked ultraviolet excimer laser beam 64 traverses first marginal end region 60 to create at least one trough or recess 76 in first marginal end region 60, the recess 76 comprising a floor 78 parallel to second major exterior surface 66 and at least one wall 80 (or all walls) oriented perpendicular to floor 78 and perpendicular to second major exterior surface 66. The masking of the edges of original excimer laser beam 70 enables the formation of at least one wall 80 oriented perpendicular to floor 78. It is also important that original excimer laser beam 70 is masked to achieve sharp corners at the top and bottom of wall 80 formed during excimer laser ablation. When the excimer laser beam 70 is not masked, wall 80 of trough or recess 76 is rounded at the intersection of wall 80 and major exterior surface 66 and at the intersection of wall 80 and floor 78 of trough or recess 76. A rounded shape at these intersections fails to provide the greatly superior locking effect achieved when wall 80 intersects both major exterior surface 60 and the floor 78 of trough or recess 76 at right angles. Any suitable masking plate material may be utilized. A typical masking plate 72 comprises a metal. Any suitable metal may be utilized. Typical metals include, for example, stainless steel, carbon steel, nickel, and the like. Further, with masked excimer laser beam 64 utilized in the process of this invention, no heat is generated and the components of electrophotographic imaging member 62 are not degraded by heating or burning. This also avoids heat distortion of areas adjacent the path of laser beam 64 and achieves greater control of the shape of the trough or recess 76 created by masked ultraviolet excimer laser beam 64. Thus, masked ultraviolet excimer laser beam 64 utilized in this invention removes coating layers from marginal end region 60 of electrophotographic imaging member 62 with greater precision to expose substrate layer 82 of electrophotographic imaging member 62 and avoids the formation of a seam splash which normally occurs during ultrasonic welding.

Illustrated in FIG. 6A is a schematic illustration of first marginal end region 84 and second marginal end region 86 of flexible electrophotographic imaging member 88 comprising supporting substrate 90 sandwiched between anti-curl backing layer 92 and composite layer 94. For purposes of simplification, composite layer 94 is depicted as only a single layer but represents the combination of charge transport layer 26, charge generating layer 28, adhesive layer 30, charge blocking layer 32, and conductive layer 34 shown in FIG. 1. A first rectangular shaped segment of material comprising part of anti-curl backing layer 92 and part of supporting substrate 90 have been removed from first major exterior surface 96 at first marginal end region 84 adjacent and parallel to first edge surface 100 by means of the masked excimer laser ablation process of this invention to form a first steplike ledge comprising a first tread 102 having an elongated, rectangular shape when viewed in a direction perpendicular to said first major exterior surface 96 and to also form first wall or riser 103. First wall or riser 103 forms right angle intersections with first tread 102 and first major exterior surface 96. Also shown is the other opposite end of flexible imaging member 88 after a second rectangular shaped segment of material has been removed by masked excimer laser ablation from second major exterior surface 104 adjacent and parallel to second edge surface 106 to form a second steplike ledge comprising second tread 108 having an elongated, rectangular shape which substantially complements the profile of first tread 102. Also simultaneously formed by the laser ablation treament is second wall or riser 109. Second wall or riser 109 forms right angle intersections with second tread 108 and second major exterior surface 104.

As shown in FIG. 6B first tread 102 and second tread 108 have been brought into contact with each other to form a mated overlapping region and then ultrasonically welded together to form an excellent overlapping seam morphology having a thickness that only slightly exceeds the original thickness of imaging member 88. Also simultaneously mated are first edge surface 100 to second wall or riser 109 and second edge surface 106 to first wall or riser 103. Material displacement and surface alteration of opposite marginal end regions of imaging member 88 enables direct surface to surface contact of supporting substrate 90 at both ends during the overlapping and ultrasonic fusion steps to achieve intimate fusion of the ends of imaging member 88 to each other with no molten mixtures of imaging layer material being ejected out to either side of the seam to form splashings during the ultrasonic seam welding operation. The resulting seam configuration is thin, unitary and with a smooth surface profile. Direct fusing of supporting substrate 90 at first tread 102 to supporting substrate 90 at second tread 108, first edge surface 100 to second wall or riser 109, and second edge surface 106 to first wall or riser 103 provide enhanced seam strength, because of the greatly enlarged exposed areas of supporting substrate 90 material that are mated to each other and better support substrate contact during ultrasonic fusing. Because a unitary structure forms during fusing, the right angle corners formed beween first tread 102 and first wall or riser 103 and between second tread 108 and second wall or riser 109 do not form stress concentration regions which would otherwise be expected to weaken the fused seam. In addition, masked excimer laser removal of a rectangular shaped segment forms a rectangular trough or recess which contributes to maintenance of precise allignment of the imaging member ends relative to each other during ultrasonic welding. Still other embodiments of a rectangular trough or recess profile include two or more trough-shape profiles are illustrated in FIGS. 7 through 9.

Referring to FIG. 7A, a first segment of material from first major exterior surface 96 is removed by masked excimer ablation to form a first channel 110 substantially parallel to and spaced from first edge surface 100 of first marginal end region 84 by a first ribbon shaped zone on first major exterior surface 96, first channel 110 having a first wall or riser 112, a second wall or riser 114 and a flat floor or tread 116. Flat floor or tread 116 is substantially parallel to second major exterior surface 104. First wall or riser 112 is substantially perpendicular to first major exterior surface 96 and closer to first edge surface 100 of first marginal end region 84 than second wall 114. Also, in the ribbon shaped zone separating first channel 110 from first edge surface 100 of first marginal end region 84, all surface material is removed by a masked excimer laser to a predetermined depth to form a first plateau or step 118 having a substantially flat surface parallel to second major surface 104, the predetemined depth being less than the height of second wall 114 of first channel 110. Preferably, the predetermined depth is between about 50 percent and about 70 percent of the height of second wall 114. If desired, the sequence of formation of floor or tread 116 and first plateau or step 118 may be reversed. Similarly, a second segment of material from second major exterior surface 104 is removed by masked excimer ablation to form a second channel 120 substantially parallel to and spaced from second edge surface 106 of second marginal end region 86 by a second ribbon shaped zone on second major exterior surface 104, second channel 120 having a first wall or riser 122, a second wall 124 and a flat floor or tread 126. Flat floor or tread 126 is substantially parallel to first major exterior surface 96. First wall or riser 122 is substantially perpendicular to second major exterior surface 104 and closer to second edge surface 106 of second marginal end region 86 than second wall 124. Further, in the ribbon shaped zone separating second channel 120 from second edge surface 106 of second marginal end region 86, all surface material is removed by a masked excimer laser to a predetermined depth to form a second plateau or step 128 having a substantially flat surface parallel to first major surface 96, the predetermined depth being less than the height of second wall 124 of second channel 120. Preferably, the predetermined depth is between about 50 percent and about 70 percent of the height of second wall 124. Second channel 120 and second plateau or step 128 being a reverse mirror image of first plateau or step 118 and first channel 110, respectively. If desired, the sequence of formation of floor or tread 126 and first plateau or step 128 may be reversed.

As ilustrated in FIG. 7B first marginal end region 84 is overlapped over second marginal end region 86 whereby the flat surface of first plateau or step 118 mates with the flat floor or tread 126 of second channel 120, the flat surface of second plateau or step 128 mates with the flat floor or tread 116 of first channel 110, the second wall 114 of first channel 110 mates with the second edge surface 106, and first wall or riser 112 mates with first wall or riser 122 to mechanically interlock marginal end regions 84 and 86 together. The overlapped marginal end regions 84 and 86 are then fused together to form a unitary seam that exhibits increased seam strength that resists tensile rupture, substantially no splashing, and minimum seam thickness as illustrated in FIG. 7B. Because a unitary structure forms during fusing, the right angle corners formed between second wall 114 and floor or tread 116, between first wall or riser 112 and first plateau or step 118, between second wall 124 and floor or tread 126, and between first wall or riser 122 and floor or tread 126 do not form stress concentration regions which would otherwise be expected to weaken the fused seam.

Another thin profile seam design embodiment of this invention is illustrated in FIGS. 8A and 8B. The morphologies of first plateau or step 118, first channel 110, first wall or riser 112, floor or tread 116, second channel 120, second wall 114, second plateau or step 128, first wall or riser 122, floor or tread 126 and second wall 124 are essentially identical to those of FIGS. 7A and 7B, except that additional sets of plateaus 130 and 132 and additional floors or treads 134 and 136 accompanied by the adjacent walls or risers are formed by masked excimer ablation to provide added mechanical interlocking at the overlap region for tensile seam strength enhancement. If a further increase in seam strength is desired to resist rupture, additional toughs and plateaus may be formed by employing the same masked excimer laser ablation process. Formation of the fused seam shown in FIG. 8B is accomplished in substantially the same way as for the fused seam shown in FIG. 7B.

In still another embodiment, a hybrid of the embodiments of FIGS. 6A, 6B, 7A and 7B is shown in FIGS. 9A and 9B. In this embodiment, treads 140 and 142 are formed at each end of a flexible sheet in a manner similar to treads 102 and 108 illustrated in FIGS. 6A and 6B, plateaus 144 and 146 are formed in a manner similar to plateaus 118 and 128 illustrated in FIGS. 7A and 7B, floor or treads 148 and 150 are formed in a manner similar to floor or treads 116 and 126 illustrated in FIGS. 7A and 7B, and plateaus 152 and 154 are formed to ultimately contact and fuse to treads 150 and 148, respectively. Formation of the fused seam shown in FIG. 9B is accomplished in substantially the same way as for the fused seams shown in FIGS. 6B and 7B.

Generally, multiple troughs further increase the interlocking effect when the ends of a belt blank are overlapped for welding. Multiple passes with a single excimer laser beam or a sequential passage of multiple separate laser beams are desirable to obtain the troughs and plateaus illustrated in FIGS. 7A and 7B, 8A and 8B, and 9A and 9B. The dimensions of the interlocking troughs depend on the total number of troughs used in each of the ends of a belt blank and also on the amount of overlap of the belt ends at the seam. In the prior art, wide overlapping of the ends of a belt blank was avoided because of the excessively large seam splashing that forms during welding. This large seam splashing interfered with blade cleaning and would eventually partially detach due to collisions with the cleaning blade and stress imposed when transported over small diameter rollers. However, reduction in the amount of seam overlap lowered the seam rupture strength. With the interlocking belt end configurations formed by the masked excimer laser shaping process of this invention, a seam with little or no splashing is formed and greater overlap may be achieved with greater seam strength.

Generally, a trough or channel formed in the marginal end regions of the rectangular belt blanks of this invention are parallel to the outermost edge of the ends of the belt blanks. The floor of the trough or channel is substantially parallel and spaced from the outer surface of the belt blank. The walls or risers of each trough or channel farthest from the outermost end of the belt blank is at substantially right angles to the trough or channel floor and adjacent outer surfaces of the belt to ensure more precise alignment of the overlapped belt blank ends prior to and during ultrasonic welding. Multiple troughs ensure more perfect alignment and secure interlocking of the overlapping ends of a rectangular belt blank after welding. The expressions substantially parallel and substantially perpendicular are intended to include surfaces that might deviate very slightly from being perfectly parallel or perpendicular. However, the deviation should be less than about 5 degrees from being perfectly parallel or perpendicular. When deviation is greater than about 5 degrees, the advantages of achieving precise alignment of the blank ends during ultrasonic welding diminishes noticeably. An unmasked excimer laser beam has the profile which produces trough or channel/wall combinations or plateau/riser combinations having rounded corners which contribute to sliding of the overlapped ends of the photoreceptor blank over each other during ultrasonic welding.

The process of this invention achieves a sharp corner between the wall and floor of each trough or channel or between a plateau and riser which prevents the overlapped ends of the photoreceptor blank from sliding over each other during ultrasonic welding. Thus, the ends of the photoreceptor blank remain aligned with each other during ultrasonic welding. The sharp right angle intersection or corner reduces the likelihood of the overlapped belt blank ends from sliding relative to each other in a direction perpendicular to the centerline of the belt seam during the ultrasonic welding process. This provides a seam having high seam strength and a welded belt with precise predictable dimensions and conicity. Although a sharp corner between a wall and floor of a trough formed in a photoreceptor blank concentrates stresses at the corner that weakens the belt when subjected to stress, the sharp corner disappears during ultrasonic welding because the overlapped ends are fused together into unitary solid. This eliminates regions that can concentrate stress. In other words, the sharp corners formed do not present a sharp stress concentration problem because the overlapped ends of the belt blank are fused into a continuous solid substantially free of any exposed sharp corners. The welded seams of this invention also minimize formation of a rippled surface at or adjacent the welded seam. This may be due to various reasons including the capability to use less ultrasonic energy to achieve the same seam strength through an enhanced locking mechanism achieved with the wall or riser and trough, channel or plateau combinations formed in the belt blank ends of this invention. The reduced ultrasonic energy required for fusing also minimizes the development of air bubbles between the photoreceptor coating layers at the seam orelap regions. In addition to the forming of thin seam profile of this invention, little or no splashing/flashing development also provides a smoother seam surface morphology.

A satisfactory overlap width of each mated surface region or each contiguous contact width, measured in a direction perpendicular to the length of the mated surface region (i.e. measured in a direction circumferentially of the final belt), is between about 0.5 millimeter and about 3.5 millimeters. An overlap width of between about 0.6 millimeter and about 2 millimeters is particularly preferred. Optimum overlap improvement is achieved with an overlap width of between about 0.8 millimeter and about 1.5 millimeters. The width of the overlap region should preferably be at least about 400 percent greater than the thickness of the original belt blank. Further, to attain the improved results of this invention, the average thickness between the freshly created laser ablated flat surface (e.g. floor, tread, plateau or step) and its adjacent outer major exterior surface (i.e. thickness of the belt after laser ablation) for each reshaped marginal end regions of the imaging member sheet, measured in a direction perpendicular to the major exterior surface in the region of actual contact between the overlapping ends, should be in a range between about 52 percent and about 60 percent of the thickness of the original imaging member in order to achieve invention benefits. The final welded belt preferably has a maximum seam thickness less than about 120 percent of the thickness of the original imaging member prior to ablation treatment to minimize the adverse effects of collisions between the belt seam or components thereof and various subsystems of electrophotographic imaging systems. Preferably, the minimum seam centerline thickness is about the thickness of the rest of the imaging member in order to avoid any pronounced depression which could collect toner particles and other undesirable debris.

The overlapped edges may be joined by any suitable technique. Typical joining techniques include, for example, welding, gluing, taping, and the like and combinations thereof. Preferably, the overlapped edges are welded together by conventional ultrasonic welding techniques such as those described, for example, in U.S. Pat. No. 4,532,166, U.S. Pat. No. 4,838,964 and U.S. Pat. No. 4,937,117, the disclosures of these patents being incorporated herein by reference in their entirety. It should also be noted that attempts to reshape an imaging member end with an infrared $CO_2$ laser having a wavelength of about 10.2 micrometers resulted in the laser beam burning straight through an imaging member end. Attempts to shape an imaging member end with an infrared YAG laser having a wavelength of about 1.6 micrometers also failed to produce the shaped ends achieved with the masked excimer laser ablation process of this invention.

It is evident that in accordance to the present invention, the technique for fabricating a flexible imaging member belt from a rectangular sheet produces a seamed flexible imaging member belt free of excessively thick seams and large seam splashings in the seam area as is typically founded in prior art seamed flexible imaging members used in electrophotographic imaging systems. The improved seamed belts of this invention extend the service life of the belt as well as enhancing subsystems performance. The flexible imaging member belts having the thin seam profile of the present invention significantly suppress seam mechanical interaction with cleaning blades, belt support rollers and acoustic image transfer assist subsystems. They also reduce velocity variation of cycling imaging belts, extend dynamic fatigue cracking/delamination resistance of the seam during passage over small diameter belt supprt rollers, and are also compatible with imaging systems employed liquid toner development. Thus, with the seams of this invention, no seam splash is formed during ultrasonic welding. The welded seams of this invention provide exceptionally strong seam strength.

This invention will further be illustrated in the following, non-limiting examples, it being understood that these examples are intended to be illustrative only and that the invention is not intended to be limited to the materials, conditions, process parameters and the like recited therein.

EXAMPLE I

A photoconductive imaging member web was prepared by providing a titanium coated polyester substrate having a thickness of 3 mils (76.2 micrometers) and applying thereto, using a gravure applicator, a solution containing 50 gms 3-aminopropyltriethoxysilane, 50.2 gms distilled water, 15 gms acetic acid, 684.8 gms of 200 proof denatured alcohol and 200 gms heptane. This layer was then allowed to dry for 5 minutes at 135° C. in a forced air oven. The resulting blocking layer had a dry thickness of 0.05 micrometer.

An adhesive interface layer was then prepared by applying with a gravure applicator to the blocking layer a wet coating containing 5 percent by weight based on the total weight of the solution of polyester adhesive in a 70:30 volume ratio mixture of tetrahydrofuran/cyclohexanone. The adhesive interface layer was allowed to dry for 5 minutes at 135° C. in the forced air oven. The resulting adhesive interface layer had a dry thickness of 0.07 micrometer.

The adhesive interface layer was thereafter coated with a charge generating layer containing 7.5 percent by volume trigonal Se, 25 percent by volume N,N'-diphenyl-N,N'-bis (3-methylphenyl)-1,1'-biphenyl-4,4'-diamine, and 67.5 percent by volume polyvinylcarbazole. This charge generating layer was prepared by introducing 8 gms polyvinyl carbazole and 140 ml of a 1:1 volume ratio of a mixture of tetrahydrofuran and toluene into a 20 oz. amber bottle. To this solution was added 8 grams of trigonal selenium and 1,000 gms of 1/8 inch (3.2 millimeter) diameter stainless steel shot. This mixture was then placed on a ball mill for 72 to 96 hours. Subsequently, 50 gms of the resulting slurry were added to a solution of 3.6 gm of polyvinyl carbazole and 20 gm of N,N'-diphenyl-N,N'-bis(3-methylphenyl)-1,1'-biphenyl-4,4'-diamine dissolved in 75 ml of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). This charge generating layer was dried at 135° C. for 5 minutes in the forced air oven to form a charge generating layer having a dry thickness of 2.0 micrometers.

This coated imaging member web was overcoated with a charge transport layer extrusion of the coating material. The charge transport layer was prepared by introducing into an amber glass bottle in a weight ratio of 1:1 N,N'-diphenyl-N,N'-bis(3-methylphenyl)-1,1'-biphenyl-4,4'-diamine and Makrolon R, a polycarbonate resin having a molecular weight of from about 50,000 to 100,000. The resulting mixture was dissolved in 15 percent by weight methylene chloride. This solution was applied on the charge generator layer by extrusion to form a coating which upon drying had a thickness of 24 micrometers.

The resulting photoreceptor device containing all of the above layers was dried at 135° C. in the forced air oven for 5 minutes.

An anti-curl back coating was prepared by combining 88.2 gms of polycarbonate resin, 0.9 gm of polyester resin and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear disperser to form the anti-curl back coating solution. The anti-curl back coating solution was then applied to the rear surface (side opposite the photogenerator layer and charge transport layer) of the photoconductive imaging member web by extrusion coating and dried at 135° C. for about 5 minutes in the forced air oven to produce a dried film having a thickness of 14 micrometers. The final dried photoconductive imaging member web had a total thickness of 116.2 micrometers.

EXAMPLE II

The photoconductive imaging member web of Example I was cut to provide eight 10.16 cm (4 in.)×10.16 cm (4 in.) imaging samples that were divided equally into four sets of two samples per set for fabrication into four morphologically different seam configurations and for their respective physical/mechanical evaluations.

In the first set of two samples, one end of each sample had a vertical cut end (cut in a direction perpendicular to the upper surface of the sample). The vertical cut end of one sample was overlapped a distance of about 1.25 millimeters over the cut end of the other sample in a manner similar to that illustrated in FIG. 1 and joined by conventional ultrasonic welding techniques using 40 KHz sonic energy supplied to a welding horn to form a seam similar to that illustrated FIG. 2. The welding horn had a flat bottom that was 1 millimeter wide and 13 millimeters long, the longer dimension being perpendicular to the length of the seam. This seam sample had a thickness equivalent to about 165 percent the thickness of the imaging member and was used to serve as a control for comparison purposes.

EXAMPLE III

In a second set of two samples described in Example II, one edge of each respective sample was subjected to an infrared, $CO_2$ laser, ablation process for surface profile reshaping. This attempt failed to yield successful results due to direct material burn through at the sample edge.

EXAMPLE IV

In a third set of two samples described in Example II, one edge of each respective sample was subjected to an infrared, YAG, laser ablation process for surface profile reshaping. However, this attempt was also unsuccessful to produce the desired shape altering result.

EXAMPLE V

In a fourth set of two samples described in Example II, the bottom surface of an edge of one the other same top surface of an edge of the other sample were successfully shape altered using a masked KrF excimer laser, having an UV wavelength of 248 nm and a pulse frequency of 200 Hz, to produce a recess by removal of material having a rectangular-shaped profile identical to that shown in FIG. 6 when probed with a three-dimensional surface analyzer (Model T-4000, available from Hommel American, Inc.). The riser had a height of 50 micrometers and the tread (also referred to as floor, tread, plateau or step) had a width of 1.5 micrometers. The riser was perpendicular to the surface of the tread and also perpendicular to the outer surfaces of the imaging member. The masked excimer laser ablation process enabled precise material removal with excellent accuracy at the edge of each sample to yield the desired the sharp right angle profile between the tread and riser and the desired thining effect. The resulting thickness (i.e. thickness between the freshly created laser ablated flat tread and its adjacent outer major exterior surface) of each shape altered edge was about 57 percent of the original imaging member thickness.

The edges of the two samples were overlapped to mate the freshly created laser ablated flat tread of one sample with the freshly created laser ablated flat tread of the other sample and to mate the riser of each sample with the edge of the other sample. The mated samples were subjected to an ultrasonic welding operation to fuse them into a unitary seam using the procedures described in Example II. The fabricated seam had a thickness of about 110 percent of the original imaging member thickness and exhibited no visible splashing/flashing.

EXAMPLE VI

The physical and mechanical properties of the photoconductive imaging members having different morphological seam designs of Examples II and V were evaluated to determine the seam area thickness, splashing dimension, surface quality, seam rupture strength, and dynamic fatigue endurance seam failure. For seam thickness measurement, a micrometer was used to measure the thickness of the seam as well as the thickness of the imaging member.

Since the surface quality of the seam and the splashing have a direct impact on cleaning efficiency and wear life of a cleaning blade, imaging belt velocity variation during cycling, copy quality printout, and compatibility with liquid development system/metering roll function, these seam designs were analyzed using a surface analyzer (Surftest 402, available from Mitutoyo Corporation). Each seam sample from the above Examples were mounted and held down on the platform of the instrument. A stylus was allowed to travel across each seam sample to characterize the seam. The surface profile of the seam detected during stylus travel was recorded with a chart recorder to yield a surface characteristics profile of the seam overlap and adjacent splashings.

For seam strength determination, the following testing procedures were followed using an Instron Tensile Tester (Model TM, available from Instron Corporation):

(a) Cut a strip of test sample from each of the seam designs from the above Examples. Each test sample had the dimensions 1.27 cm×10.16 cm (0.5 in.×4 in.) with the seam situated at the middle and perpendicular to the long dimension of the test sample.

(b) Insert the test sample into the Instron jaws using a 5.08 cm (20 inch) gage length and postion the seam at the center between the jaws.

(c) Pull the seam sample at a cross-head speed of 5.08 cm/minute (2 in./minute), a chart speed at 5.08 cm/minute (2 in./minute), at a calibration of 50 pounds (22 kilograms) full scale to tensile seam rupture.

(d) Divide the load, in pounds, required to rupture the seam by 0.5 in. to obtain the seam rupture strength in lbs/in.

For seam dynamic fatigue endurance testing, a 2.54 cm.×20.22 cm (1 in.×8 in.) test sample having the seam situated at the middle and perpendicular to the length of the test sample was cut from each seam design of the above Examples. With a one pound weight attached at one end to provide a one lb./in. width tension, the test sample with the seam was 180° wrapped over a 0.12 in. (3.0 millimeter) diameter free rotating roller and the opposite end of the test sample was gripped by hand. Under these conditions, the seam of the test sample was dynamically flexed back and forth over the roller by manually moving the gripping hand up and down, at a rate of one flex per second, until seam cracking/delamination occurred. The results obtained from these tests are tabulated in Table I below. As shown in the table, implementation of the morphologically improved seam configurations produced by the process of this invention for photoconductive imaging member belts significantly reduced seam thickness and yielded nil seam splashing. Since imaging member belts will be subjected to only a constant 0.18 kg/cm (1 lb./in.) width belt tension under machine operating conditions, the slightly lower seam rupture strength of 8.19 kgs/cm (45.8 lbs./in.) for the thin profile seam design of Example V than the 8.8 kgs/cm (49.4 lbs./in.) for that of the prior art control seam counterpart of Example II is considered practically insignificant.

More importantly, the dynamic fatigue life of the thin profile design of this invention was seen to outlast the conventional control seam when flexed over a small 3.0 millimeter diameter roller. The control seam was observed to develop seam cracking/delamination at only about 10 flexes whereas the seam configurations of this invention showed no evidence of seam failure after 1,000 flexes during testing. Unlike the excessive seam thickness observed in the control seam, which was fabricated according to the procedures described in the prior art, the thin profile seam design of Example V had little added seam thickness compared to the thickness of the remaining portion of the imaging member. This reduction in seam thickness of this invention had significantly decreased the bending stress encountered during flexing over the roller, and therefore, increased the fatigue endurance of the seam.

TABLE I

| Example | Member Thickness (microns) | Seam Thickness (microns) | Splash Length (mms) | Seam Strength (lbs./in.) | Seam Delamination (flexes) |
|---|---|---|---|---|---|
| II (Control) | 116.2 | 191.2 | 1.00 | 49.4 | 10 |
| V (Invention) | 116.2 | 127.8 | 0.00 | 45.8 | >1,000 |

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for fabricating a flexible belt comprising, providing a flexible sheet having a substantially rectangular shape, said sheet having a first major exterior surface opposite and parallel to a second major exterior surface and a first edge surface of a first marginal end region of said sheet opposite to and parallel with a second edge surface of a second marginal end region; removing by ablation with a masked excimer laser beam a first segment of material from said first major exterior surface at said first marginal end region to form at least one recess comprising at least one fresh substantially flat surface intersecting at least one adjacent wall at a right angle, said flat surface being substantially parallel to and spaced from said second major exterior surface; removing by ablation with a masked excimer laser beam a second segment of material from said second major exterior surface at said second marginal end region to form at least one recess comprising at least one fresh substantially flat surface intersecting at least one adjacent wall at a right angle, said flat surface at said second marginal end being substantially parallel to and spaced from said first major exterior surface; overlapping said first marginal end region over said second marginal end region whereby said fresh substantially flat surface at said first marginal end region mates with said fresh substantally flat surface at said second marginal end region; and fusing the overlapped end regions together to form a fused seam.

2. A process according to claim 1 wherein said fused seam has a thickness of less than about 120 percent of the thickness of said sheet.

3. A process according to claim 1 wherein said overlapped end regions are fused together by ultrasonic welding.

4. A process according to claim 1 wherein said masked excimer laser beam is an ultraviolet excimer laser beam.

5. A process according to claim 1 wherein said belt is an electrostatographic imaging member.

6. A process according to claim 5 wherein said belt is an electrophotographic imaging member comprising at least a substrate and a photoconductive layer.

7. A process according to claim 5 wherein said belt is an electrographic imaging member comprising at least a substrate and a dielectric imaging layer.

8. A process according to claim 1 wherein said overlapped end regions form a seam having a width between about 0.5 millimeter and about 3.5 millimeters.

9. A process for fabricating a flexible belt comprising, providing a flexible sheet having a substantially rectangular shape, said sheet having a first major exterior surface opposite and parallel to a second major exterior surface and a first edge surface of a first marginal end region of said sheet opposite to and parallel with a second edge surface of a second marginal end region; removing by ablation with a masked excimer laser beam a first segment of material from said first major exterior surface at said first marginal end region to form a first step shaped ledge, said first step shaped ledge comprising a first tread extending from said first edge surface to a first riser, said first riser being substantially perpendicular to said first major exterior surface and parallel to and spaced from said first edge surface of said first marginal end region, and said first tread being substantially parallel to and spaced from said second major exterior surface; removing by ablation with a masked excimer laser beam a second segment of material from said second major exterior surface at said second marginal end region to form a second step shaped ledge, said second step shaped ledge comprising a second tread extending from said second edge surface to a second riser, said second riser being substantially perpendicular to said second major exterior surface and substantially parallel to and spaced from said second edge surface of said second marginal end region, and said second tread being substantially parallel to and spaced from said first major exterior surface, said second step shaped ledge being a reverse mirror image of said first step shaped ledge; overlapping said first marginal end region over said second marginal end region whereby said first tread mates with said second tread, said first riser mates with said second edge surface, and said second riser mates with said first edge surface; and fusing the overlapped end regions together to form a fused seam.

10. A process for fabricating a flexible belt comprising, providing a flexible sheet having a substantially rectangular shape, said sheet having a first major exterior surface opposite and substantially parallel to a second major exterior surface and a first edge surface of a first marginal end region of said sheet opposite to and substantially parallel with a second edge surface of a second marginal end region; removing by ablation with a masked excimer laser beam a first segment of material from said first major exterior surface to form a first channel substantially parallel to and spaced from said first edge surface of said first marginal end region by a first ribbon shaped zone on said first major exterior surface, said first channel having a first wall, a second wall and a floor, said first wall being substantially perpendicular to said first major exterior surface and closer to said first edge of said first marginal end region than said second wall; removing by ablation with a masked excimer laser beam substantially all surface material to a predetermined depth from said first ribbon shaped zone to form a first plateau having a substantially flat surface parallel to said second major surface, said predetemined depth being less than the height of said second wall of said first channel; removing by ablation with a masked excimer laser beam a second segment of material from said second major exterior surface to form a second channel parallel to and spaced from said second edge of said second marginal end region by a second ribbon shaped zone on said second major exterior surface, said second channel having a first wall, a second wall and a floor, said first wall of said second channel being substantially perpendicular to said second major exterior surface and closer to said second edge of said second marginal end region than said second wall of said second channel, said second channel and said second ribbon shaped zone being a reverse mirror image of said first channel and said first ribbon shaped zone, respectively; removing by ablation with a masked excimer laser beam substantially all surface material to a predetermined depth from said second ribbon shaped zone to form a second plateau having a flat surface substantially parallel to said first major surface, said predetemined depth being less than the height of said second wall of said second channel; overlapping said first marginal end region over said second marginal end region whereby said flat surface of said first plateau mates with said floor of said second channel, said flat surface of said second plateau mates with said floor of said first channel, said second wall of said first channel mates with said second edge surface, said second wall of said second channel mates with said first edge surface, and said first wall of said second channel mates with said first wall of said first channel to mechanically interlock said end regions together; and fusing the overlapped end regions togther to form a fused seam.

11. A process acording to claim 9 wherein said removing by ablation with a masked excimer laser beam all surface material to a predetermined depth from said first strip to form said first plateau is accomplished prior to removing by ablation with a masked excimer laser beam said first segment of material from said first major exterior surface to form said first channel, and removing by ablation with a masked excimer laser beam all surface material to a predetermined depth from said second strip to form said second plateau is accomplished prior to removing by ablation with a masked excimer laser beam said second segment of material from said second major exterior surface to form said second channel.

12. A process for fabricating a flexible belt comprising, providing a flexible sheet having a substantially rectangular shape, said sheet having a first major exterior surface opposite and parallel to a second major exterior surface and a first edge surface of a first marginal end region of said sheet opposite to and parallel with a second edge surface of a second marginal end region; removing by ablaton with a masked excimer laser beam a first segment of material from said first major exterior surface at said first marginal end region to form at least one recess comprising at least one fresh substantially flat surface intersecting at least one adjacent wall at a right angle, said flat surface being substantially parallel to and spaced from said second major exterior surface; removing by ablation with a masked excimer laser beam a second segment of material from said second major exterior surface at said second marginal end region to form at least one recess comprising at least one fresh substantially flat surface intersecting at least one adjacent wall at a right angle, said flat surface at said second marginal end being substantially parallel to and spaced from said first major exterior surface; overlapping said first marginal end region over said second marginal end region whereby said fresh substantially flat surface at said first marginal end region mates with said fresh substantially flat surface at said second marginal end region; and fusing the overlapped end regions together to form a fused seam, said flat surface being substantially parallel to said second major exterior surface is the floor of a first channel, said first channel being substantially parallel to and spaced from said first edge surface of said first marginal end region by a first ribbon shaped zone on said first major exterior surface, said first channel having a first wall, a second wall and a floor, said first wall being substantially perpendicular to said first major exterior surface and closer to said first edge of said first marginal end region than said second wall; said first ribbon shaped zone comprises a first plateau having a substantially flat surface parallel to said second major surface, said first wall of said first channel having a height, relative to said floor of said first channel, less than the height of said second wall of said first channel; and said flat surface parallel to said first major exterior surface is the top of a second plateau, said second plateau separating a second channel from said second edge of said second marginal end region, said second channel having a first wall, a second wall and a floor, said first wall of said second channel being substantially perpendicular to said second major exterior surface and closer to said second edge of said second marginal end region than said second wall of said second channel, said first wall of said second channel having a height, relative to said floor of said second channel, less than the height of said second wall of said second channel, and said second channel and said second plateau being a reverse mirror image of said first channel and said first plateau, respectively; overlapping said first marginal end region over said second marginal end region whereby said flat surface of said first plateau mates with said floor of said second channel, said flat surface of said second plateau mates with said floor of said first channel, said second wall of said first channel mates with said second edge surface, said second wall of said second channel mates with said first edge surface, and said first wall of said second channel mates with said first wall of said first channel to mechanically interlock said end regions together prior to said fusing of the overlapped end regions together to form said fused seam.

* * * * *